US009972197B2

(12) United States Patent
Ohashi

(10) Patent No.: US 9,972,197 B2
(45) Date of Patent: May 15, 2018

(54) REMOTE CONTROL, REMOTE CONTROL SYSTEM, AND REMOTE CONTROL METHOD

(75) Inventor: Yoshinori Ohashi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days. days.

(21) Appl. No.: 13/592,543

(22) Filed: Aug. 23, 2012

(65) Prior Publication Data

US 2013/0057395 A1 Mar. 7, 2013

(30) Foreign Application Priority Data

Aug. 31, 2011 (JP) ................................ 2011-189239

(51) Int. Cl.
*G05B 11/01* (2006.01)
*G08C 19/16* (2006.01)
*G08C 17/02* (2006.01)

(52) U.S. Cl.
CPC ......... *G08C 17/02* (2013.01); *G08C 2201/91* (2013.01); *G08C 2201/93* (2013.01)

(58) Field of Classification Search
CPC ..... G08C 17/02; G07C 9/00182; A63H 30/04
USPC ........................................................ 340/12.5
See application file for complete search history.

(56) References Cited

U.S. PATENT DOCUMENTS 7,139,562 B2 * 11/2006 Matsui .................. G08C 17/02 340/426.13
7,649,456 B2 * 1/2010 Wakefield ............ G01S 5/0252 340/12.53
2004/0121725 A1 * 6/2004 Matsui .................. G08C 17/02 455/3.06
2008/0180228 A1 7/2008 Wakefield et al.
2008/0218334 A1 * 9/2008 Pitchers ............. H04L 41/0893 340/539.1
2012/0007725 A1 * 1/2012 Penisoara ............. G08C 17/02 340/13.25

(Continued)

FOREIGN PATENT DOCUMENTS

CN 1498030 A 5/2004
CN 101138279 A 3/2008

(Continued)

OTHER PUBLICATIONS

Combined Chinese Office Action and Search Report dated Jun. 27, 2016 in Patent Application No. 201210304283.X (with English language translation).

(Continued)

*Primary Examiner* — George Bugg
*Assistant Examiner* — Anthony D Afrifa-Kyei
(74) *Attorney, Agent, or Firm* — Oblon, McClelland, Maier & Neustadt, L.L.P.

(57) ABSTRACT

Provided is a remote control, including: a wireless communication unit configured to be capable of sending a control signal for controlling a device by means of wireless communication; and a determining unit configured to transmit a device detection request by means of the wireless communication unit, and to identify installation locations of a plurality of devices as one or more zones, respectively, based on responses from the plurality of devices having received the device detection request, each of the responses including measurement information reflecting an installation location.

12 Claims, 25 Drawing Sheets

(56) References Cited

U.S. PATENT DOCUMENTS

| | | | | |
|---|---|---|---|---|
| 2014/0062678 | A1* | 3/2014 | de Clercq | G05B 15/02 340/12.5 |

FOREIGN PATENT DOCUMENTS

| | | | | |
|---|---|---|---|---|
| CN | 101267447 | A | | 9/2008 |
| CN | 102022803 | A | | 4/2011 |
| JP | 10-257576 | | | 9/1998 |
| JP | 2002-044763 | A | | 2/2002 |
| JP | 2002-247668 | A | | 8/2002 |
| JP | 2002247668 | A | * | 8/2002 |
| JP | 2004-166193 | A | | 6/2004 |
| JP | 2004-320209 | A | | 11/2004 |
| JP | 2006-311111 | | | 11/2006 |
| JP | 2007-221194 | A | | 8/2007 |
| JP | 2007-282044 | A | | 10/2007 |
| JP | 2008-205780 | A | | 9/2008 |
| JP | 2008-537855 | A | | 9/2008 |
| JP | 2011-113531 | | | 6/2011 |

OTHER PUBLICATIONS

Office Action Received for Japanese Patent Application No. 2011-189239, dated Jan. 26, 2016, 4 Pages of Office Action.

Office Action dated Apr. 25, 2017 in Japanese Patent Application No. 2016-082246 (with English-language Translation).

Office Action dated Jun. 22, 2017 in Chinese Patent Application No. 201210304283.X (with English-language Translation).

Office Action dated Apr. 28, 2015 in Japanese Patent Application No. 2011-189239 (with English-language Translation).

Office Action dated Jul. 5, 2016 in Japanese Patent Application No. 2011-189239 (with English-language Translation).

Office Action dated Aug. 29, 2017 in Japanese Patent Application No. 2016-082246 (with English-language Translation).

* cited by examiner

400

| Device ID (410) | Room ID (420) |
|---|---|
| D1 | R1 |
| D2 | R1 |
| D3 | R1 |
| D4 | R2 |
| D5 | R2 |

FIG.12

500

| Device ID (530) | Device-type ID (510) | Command-set ID (520) |
|---|---|---|
| D1 | Light 1 | Command set1 |
| D2 | Recorder | Command set2 |
| D3 | TV | Command set3 |
| D4 | light 2 | Command set4 |
| D5 | Audio | Command set5 |

FIG.13

REMOTE CONTROL, REMOTE CONTROL SYSTEM, AND REMOTE CONTROL METHOD

CROSS-REFERENCE TO RELATED APPLICATION

The present application claims priority from Japanese Patent Application No. JP 2011-189239 filed in the Japanese Patent Office on Aug. 31, 2011, the entire content of which is incorporated herein by reference.

BACKGROUND

The present disclosure relates to a remote control, a remote control system, and a remote control method capable of remote-controlling a plurality of home electrical appliances.

The present disclosure relates to a remote control, a remote control system, and a remote control method capable of remote-controlling a plurality of home electrical appliances.

In a home, various appliances such as television receivers, recorders, and audio equipments are used. Each of those appliances is capable of being controlled by a remote control. In general, one remote control is capable of controlling one appliance. However, in recent years, a so-called universal remote control is known. One universal remote control is capable of individually controlling a plurality of different appliances (for example, refer to Japanese Patent Application Laid-open No. 2002-44763 (paragraphs 0031 to 0034 and FIG. 8) (hereinafter, referred to as Patent Document 1), and Japanese Patent Application Laid-open No. 2004-166193 (paragraphs 0029 to 0030 and FIG. 5) (hereinafter, referred to as Patent Document 2)).

According to Patent Document 1, a remote control sends a control-target device identification request signal to control-target devices. A control-target device, which has received the signal, transmits an identification signal to the remote control. The remote control receives the identification signal. In response to the identification signal, the remote control determines one device in a zone, which the remote control is capable of directly controlling. Then, the remote control executes functions to control the device.

According to Patent Document 2, a remote control detects the current location. The remote control compares the detected current location to pieces of location information of respective devices, which are stored in the remote control. The remote control determines a device located closest to the remote control as a control-target device.

SUMMARY

A plurality of devices are installed in the same room. A remote control is capable of controlling those devices by switching from device to device. In such a case and other cases, a user wishes to control the plurality of control-target devices by switching from device to device seamlessly. For example, a lighting equipment and a television receiver are installed in the same room. In the relationship of those appliances, the lighting intensity of the lighting equipment is changed according to programs watched by a user, and the like. However, according to Patent Documents 1 and 2 and other technologies, every time it is necessary for the remote control to switch control-target devices, devices and remote controls exchange signals such as identification signals. Alternatively, a user selects a target device from a list of devices, which the remote control is capable of controlling. Based on such operations and the like, control-target devices are switched. The technology of Patent Document 1 or 2 requires the above-mentioned series of processing. In other words, the remote control of Patent Document 1 or 2 may not seamlessly switch and control a plurality of devices. In addition, user-operability and user-friendliness of this kind of remote control are inadequate from a practical application standpoint. Users expect improvements in user-operability and user-friendliness.

It is desirable to provide a remote control, a remote control system, and a remote control method with improved user-operability and user-friendliness.

According to an embodiment of the present technology, there is provided a remote control, including: a wireless communication unit configured to be capable of sending a control signal for controlling a device by means of wireless communication; and a determining unit configured to transmit a device detection request by means of the wireless communication unit, and to identify installation locations of a plurality of devices as one or more zones, respectively, based on responses from the plurality of devices having received the device detection request, each of the responses including measurement information reflecting an installation location.

According to the present technology, respective installation locations of a plurality of devices are identified as one or more zones. Because of this, a user selects not a certain device but a zone. Because a user selects a zone, the remote control is capable of seamlessly switching and controlling the plurality of control-target devices in the selected zone. As a result, user-operability and user-friendliness are improved.

Further, according to the technologies of Patent Documents 1 and 2, a control-target device is determined according to the current location of the remote control. Because of this, it is necessary for the remote control to obtain the positional relation between a remote control and a control-target device, every time a user operates the remote control or every predetermined period of time. Because of this, even if a user wishes to operate the remote control promptly, the positional relation may be obtained first. As a result, the remote control may not start to control a device promptly. For example, a user, who holds a remote control in his hand, walks from zone to zone. The user tries to use the remote control in the destination zone. In this case, it is necessary for the remote control to, first, obtain the positional relation between the remote control and a control-target device in the destination zone. Because of this, the remote control may not control a device promptly. It is a nuisance for the user. However, according to the present technology, the remote control identifies the installation locations of the plurality of devices as one or more zones. Once the installation locations are identified, a zone, in which a control-target device is installed, may be called up based on the correlations, from the next time and on. As a result, user-operability and user-friendliness are improved.

The determining unit is configured to receive responses including a plurality of pieces of radio-field-intensity information, respectively, the plurality of pieces of radio-field-intensity information being detected by the plurality of devices having received the device detection request, respectively, and to identify installation locations of the plurality of devices as one or more zones, respectively, based on the plurality of pieces of radio-field-intensity information of the plurality of devices, respectively.

Pieces of radio-field-intensity information are different from each other according to distances between devices and a remote control. Because of this, based on the pieces of radio-field-intensity information, installation locations of the plurality of devices may be identified as one or more zones.

The determining unit is configured to identify installation locations of the plurality of devices as one or more zones, respectively, based on a distribution of a plurality of radio-field-intensity values, the plurality of radio-field-intensity values being replied from the plurality of devices, respectively.

Therefore, devices, of which pieces of radio-field-intensity information are similar to each other, may be identified as the same zone.

The remote control further includes: a display unit including a display screen; a zone selection unit configured to allow a user to select an arbitrary zone from the one or more zones; and a GUI display unit configured to display an operation GUI of each of one or more devices on the display screen, the installation location of each of the one or more devices being identified as the selected zone.

Because of this, a user selects not a certain device but a zone. Because a user selects a zone, the remote control is capable of seamlessly switching and controlling the plurality of control-target devices in the selected zone. As a result, user-operability and user-friendliness are improved.

The zone is a room in a building.

According to the present technology, installation locations are identified as one or more space units (for example, one or more zones, which are sectioned based on dimensions, or the like). Also, according to the present technology, installation locations may be identified as one or more rooms, which are partitioned by walls and the like, in a building.

The determining unit is configured to receive responses including a plurality of pieces of GPS (Global Positioning System) information, respectively, the plurality of pieces of GPS information being detected by the plurality of devices having received the device detection request, respectively, and to identify installation locations of the plurality of devices as one or more zones, respectively, based on the plurality of pieces of GPS information of the plurality of devices, respectively.

Pieces of GPS information are different from each other according to the actual installation locations of devices. Because of this, based on the pieces of GPS information, installation locations of the plurality of devices may be identified as one or more zones.

The determining unit is configured to identify installation locations of the plurality of devices as one or more zones, respectively, based on a distribution of a plurality of pieces of GPS information, the plurality of pieces of GPS information being replied from the plurality of devices, respectively.

Therefore, devices, of which pieces of GPS information are similar to each other, may be identified as the same zone.

The remote control further includes: a display unit including a display screen; a zone selection unit configured to allow a user to select an arbitrary zone from the one or more zones; and a GUI display unit configured to display an operation GUI of each of one or more devices on the display screen, the installation location of each of the one or more devices being identified as the selected zone.

The zone is a room in a building.

According to another embodiment of the present technology, there is provided a remote control method, including: transmitting, by a determining unit of a remote control, a device detection request by means of a wireless communication unit, the wireless communication unit being configured to be capable of sending a control signal for controlling a control-target device by means of wireless communication; and identifying, by the determining unit, installation locations of a plurality of devices as one or more zones, respectively, based on responses from the plurality of devices having received the device detection request, each of the responses including measurement information reflecting an installation location.

According to another embodiment of the present technology, there is provided a remote control system, including: a remote control; and a plurality of devices capable of being controlled by the remote control, wherein each of the devices includes a first wireless communication unit configured to be capable of receiving a control signal from the remote control by means of wireless communication, and a measuring unit configured to measure measurement information reflecting an installation location, and the remote control includes a second wireless communication unit configured to be capable of sending the control signal for controlling the device by means of wireless communication, and a determining unit configured to transmit a device detection request by means of the second wireless communication unit, and to identify installation locations of a plurality of devices as one or more zones, respectively, based on responses from the plurality of devices having received the device detection request, each of the responses including the measurement information reflecting an installation location.

According to the present technology, it is possible to seamlessly switch a plurality of devices and to control a control-target device. Therefore, user-operability and user-friendliness are improved.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 12 is a diagram showing a room correlation table;

FIG. 13 is a diagram showing a command-set ID table;

DETAILED DESCRIPTION OF EMBODIMENTS

Figure 1:
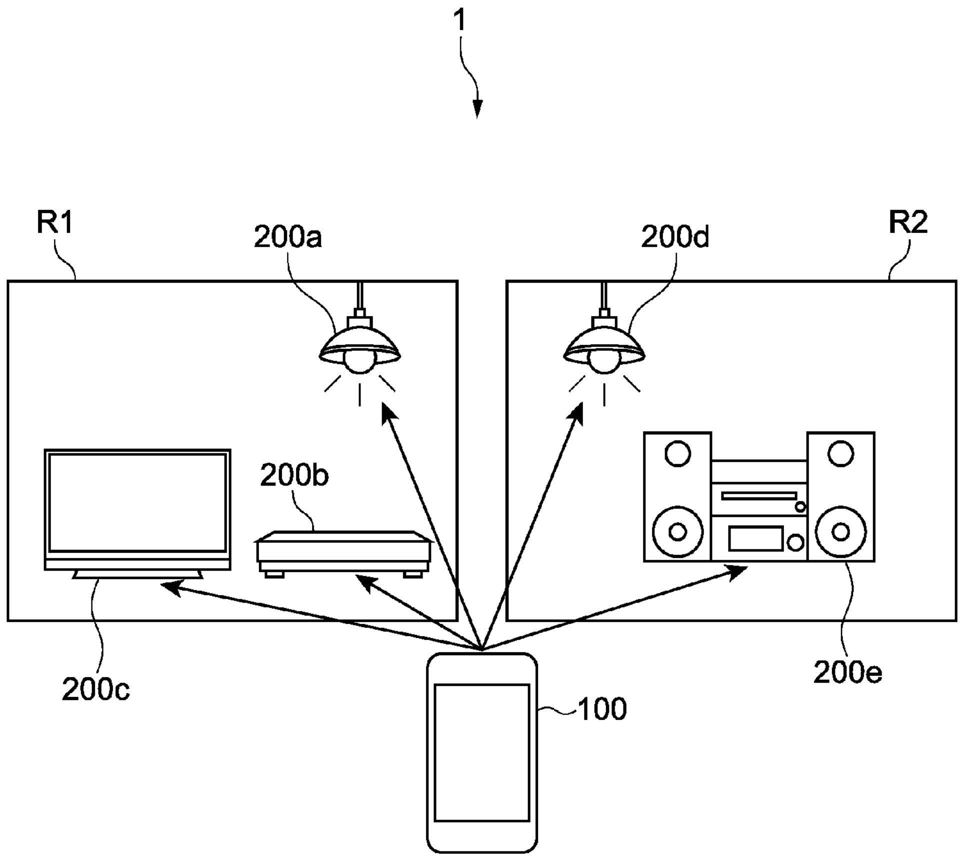
FIG. 1 is a block diagram showing the configuration of a remote control system according to a first embodiment of the present technology.

Hereinafter, embodiments of the present disclosure will be described with reference to the drawings.

In recent years, in any residential environment such as home, office, etc., electronic devices are installed in respective rooms, in general. Specifically, in a living room, a bed room, or the like, a number of electronic devices are installed. Examples of such electronic devices include television receivers, recorders, audio equipments, lighting equipments, and many kinds of other devices. According to some kind of relationships with each other, there is a possibility in that the respective electronic devices installed in one room are simultaneously controlled. For example, a lighting equipment and a television receiver are installed in the same room. In the relationship of those appliances, the lighting intensity of the lighting equipment is changed according to programs watched by a user. Also, in the relationship between a television receiver and a recorder, when a program is timer-recorded based on an EPG, the television receiver and the recorder are controlled alternately (for example, media are changed).

In the past, a typical multidevice-adaptive RF remote control or the like usually controls one of a plurality of devices, switches control-target devices, and controls another device. Therefore, it is inadequate to continuously control a plurality of electronic devices. In other words, in order to improve user-operability and user-friendliness, it is important to seamlessly control a plurality of electronic devices in each room without intermitting controls by switching control-target devices.

Each embodiment relates to a remote control capable of seamlessly controlling a plurality of electronic devices in each room without intermitting controls by switching control-target devices, as described above. More specifically, each embodiment relates to a remote control capable of operating a plurality of devices in a room by means of the same window, with which a user selects not a device but a room.

In order to implement the above-mentioned remote control, it is necessary for the remote control to register one or more devices installed in each room. In order to automatically register the devices, the remote control of each embodiment adopts the following technology. That is, the remote control transmits a device detection request by means of a wireless communication unit. Further, based on responses, which include measurement information reflecting installation locations, from a plurality of devices, which receive the device detection request, the remote control identifies locations, in which a plurality of devices are installed, as one or more rooms, respectively. Here, the "measurement information reflecting an installation location" is, specifically, a value of radio field intensity, which is measured by a device when the device receives a radio signal from the remote control (described in first embodiment). Alternatively, the "measurement information reflecting an installation location" is, specifically, GPS information as it is if a GPS communication device is installed in a device (described in second embodiment), or the like.

Hereinafter, a remote control capable of operating a plurality of devices in a room by means of the same window, with which a user selects not a device but a room, will be described. Further, processing to identify locations, in which a plurality of devices are installed, as one or more rooms, respectively, will be described.

<First Embodiment>

[Configuration of Remote Control System]

FIG. 1 is a block diagram showing the configuration of a remote control system according to a first embodiment of the present technology.

As shown in FIG. 1, a remote control system 1 of this embodiment includes a plurality of control-target devices 200*a* to 200*e*, and a remote control 100. The remote control 100 is capable of remote-controlling the plurality of devices 200*a* to 200*e* individually.

Each of the plurality of devices 200*a* to 200*e* is, for example, a lighting equipment, a recorder, a television receiver, an audio equipment, or the like. The plurality of devices 200*a* to 200*e* are installed in a plurality of rooms R1 and R2, respectively. Hereinafter, each of the plurality of devices 200*a* to 200*e* is referred to as "device 200" in a case of not distinguishing one from another.

[Hardware Configuration of Remote Control 100]

Figure 2:
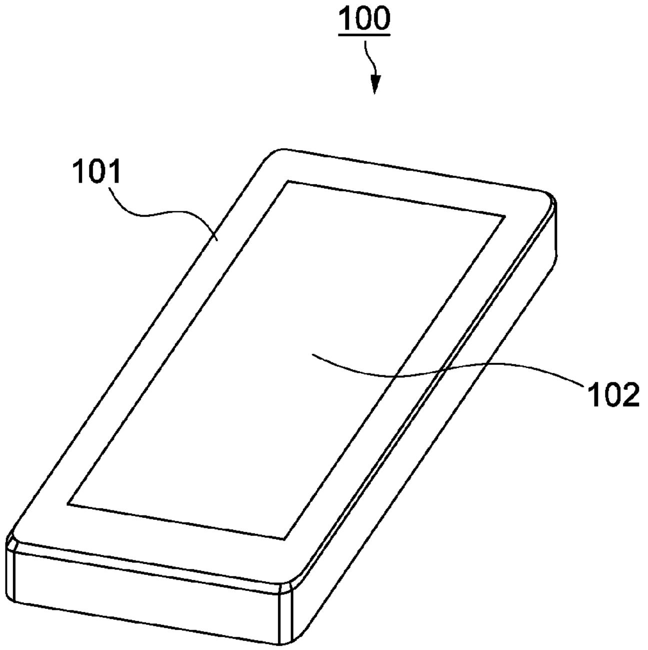
FIG. 2 is an external view showing a remote control.

FIG. 2 is an external view showing the typical remote control 100.

Figure 3:
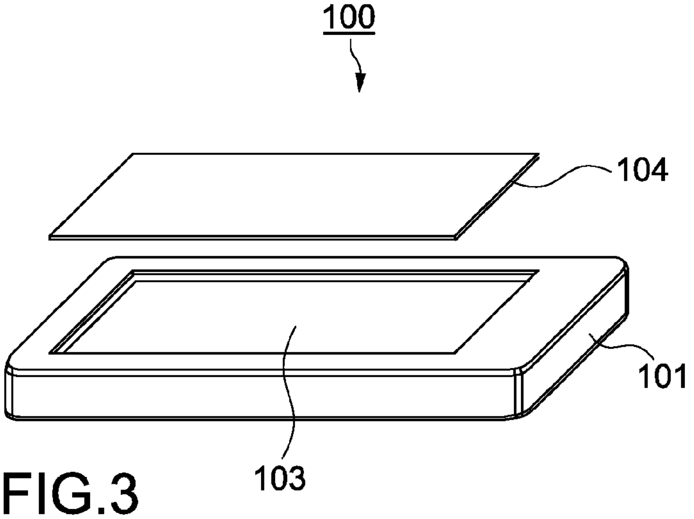
FIG. 3 is a perspective view showing the configuration of the remote control.

As shown in FIG. 2, the remote control 100 includes a substantially rectangular-parallelepiped case 101. The thickness of the case 101 is smaller than the width and depth. The the case 101 has a size that a user grasps the case 101 with one hand or larger than that. Various electronic components, which implement the remote control 100, are mounted in the substantially rectangular-parallelepiped case 101. A display unit 102 with a touchscreen is provided on one main surface of the case 101. The main surface of the case 101 and an input/output surface of the display unit 102 with a touchscreen are substantially flat. As shown in FIG. 3, the display unit 102 with a touchscreen includes a display panel 103 and a touchscreen 104. The display panel 103 is, for example, a liquid-crystal display panel, an organic EL (electroluminescence) display panel, or the like. The touchscreen 104 is superimposed on the screen of the display panel 103. The touchscreen 104 is, for example, the capacitive touchscreen 104 or the like. The touchscreen 104 may be a touchscreen of another type, which is capable of detecting a plurality of positions simultaneously pointed by a user. Examples of such a touchscreen include pressure-sensitive, infrared, and acoustic touchscreens, and other touchscreens.

Figure 4:
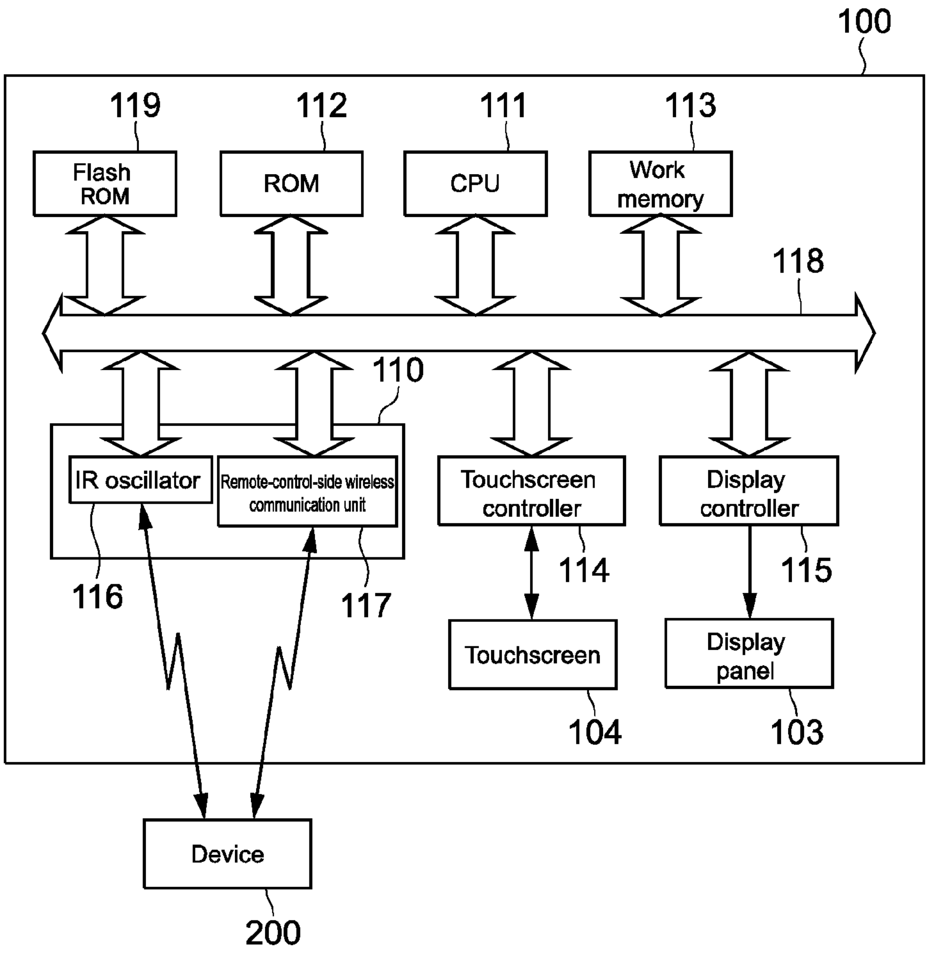
FIG. 4 is a diagram showing the hardware configuration of the remote control.

FIG. 4 is a diagram showing the hardware configuration of the remote control 100.

As shown in FIG. 4, the remote control 100 includes a CPU 111, a ROM 112, a work memory 113, a flash ROM 119, a touchscreen controller 114, a display controller 115, the touchscreen 104, the display panel 103 (display unit), an IR oscillator 116, a remote-control-side wireless communication unit 117, a bus 118, and the like.

In the device 200, the CPU 111 executes various kinds of processing according to programs stored in the ROM 112 connected via the bus 118.

The programs executed by the CPU 111, various kinds of fixed data, and the like are stored in the ROM 112.

The work memory 113 is a memory used as a workspace for arithmetic processing by the CPU 111.

The flash ROM 119 is non-volatile rewritable storage.

The touchscreen controller 114 controls the touchscreen 104, and generates digital coordinate data based on a detection signal obtained by the touchscreen 104.

The display controller 115 generates display data output to the display panel 103. The display controller 115 and the display panel 103 function as a display unit.

The CPU (Central Processing Unit) 111 controls the respective units included in the remote control 100, and controls data inputs/outputs in/to the respective units. Further, the CPU 111 is capable of executing various kinds of processing by executing programs stored in the ROM 112 and the work memory 113.

The IR oscillator 116 oscillates IR (infrared) signals. The IR (infrared) signals are pulse-modulated so as to include commands to control the device 200.

The remote-control-side wireless communication unit 117 interactively communicates with the device 200. As a wireless communication system between the remote-control-side wireless communication unit 117 and the device 200, for example, a wireless communication system using a high-transmissive wireless medium may be used. Examples of a wireless communication standard of such a wireless communication system include, for example, Wi-Fi Direct (Wi-Fi is registered trademark), RF4CE (Radio frequency for Consumer Electronics), and the like. The IR oscillator 116 and the remote-control-side wireless communication unit 117 function as a wireless communication unit 110. The wireless communication unit 110 wirelessly communicates with the device 200.

[Hardware Configuration of Device 200]

Figure 5:
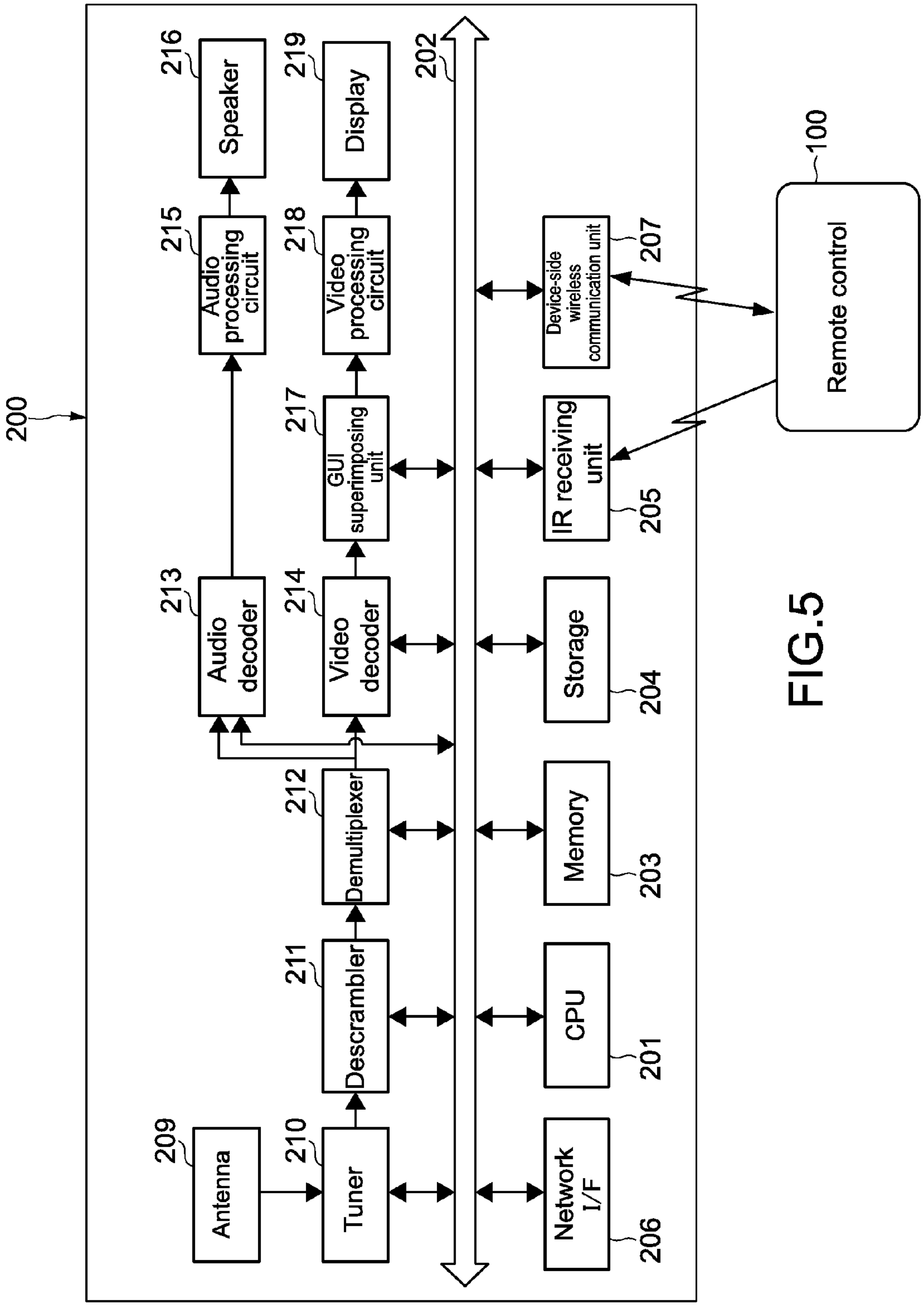
FIG. 5 is a diagram showing the hardware configuration of a device.

FIG. 5 is a diagram showing the hardware configuration of the device 200.

In this embodiment, a case where a television receiver is used as the device 200 will be described.

The device 200 includes a CPU 201, a bus 202, a memory 203, storage 204, an IR receiving unit 205, a network I/F 206, and a device-side wireless communication unit 207. The device 200 further includes an antenna 209, a tuner 210, a descrambler 211, a demultiplexer 212, an audio decoder 213, a video decoder 214, an audio processing circuit 215, a speaker 216, a GUI (Graphical User Interface) superimposing unit 217, a video processing circuit 218, and a display 219.

In the device 200, the CPU 201 executes various kinds of processing according to programs stored in the the memory 203 and the storage 204 connected via the bus 202. Further, the CPU 201 receives, as commands, infrared signals input from the remote control 100 via the IR receiving unit 205. The CPU 201 controls operations of the respective units based on the commands.

The device-side wireless communication unit 207 interactively and wirelessly communicates with the remote-control-side wireless communication unit 117 of the remote control 100. Further, the device-side wireless communication unit 207 is capable of measuring the received radio field intensity, and notifying the CPU 201 of the measurement result.

The antenna 209 receives digital broadcast signals and the like, and inputs the signals in the tuner 210.

The tuner 210 extracts a broadcast signal of a predetermined channel (for example, channel designated by the remote control 100 through a user operation) from digital broadcast signals. The tuner 210 performs demodulation processing on the extracted broadcast signal to thereby obtain a transport stream of the predetermined channel, and outputs the transport stream to the descrambler 211.

The descrambler 211 descrambles the transport stream input from the tuner 210 by using a descrambler key. The descrambler key is prerecorded in a predetermined integrated circuit card (not shown) mounted in the device 200. The descrambler 211 outputs the descrambled transport stream to the demultiplexer 212.

The demultiplexer 212 demultiplexes audio data and video data from the descrambled transport stream input from the descrambler 211. The demultiplexer 212 outputs the demultiplexed audio data to the audio decoder 213, and outputs the demultiplexed video data to the video decoder 214.

The audio decoder 213 decodes the audio data input from the demultiplexer 212, and outputs the obtained audio data to the audio processing circuit 215.

The audio processing circuit 215 performs D/A (Digital/Analog) converting processing, amplification processing, and the like on the audio data input from the audio decoder 213. The audio processing circuit 215 outputs the obtained audio signal to the speaker 216.

The video decoder 214 decodes the video data input from the demultiplexer 212, and outputs the obtained video data to the GUI superimposing unit 217.

The GUI superimposing unit 217 superimposes graphic data such as OSD (On Screen Display) on the video data input from the video decoder 214, and outputs the video data to the video processing circuit 218.

The video processing circuit 218 performs predetermined image processing, D/A (Digital/Analog) converting processing, and the like on the video data input from the GUI superimposing unit 217, and output the obtained video signal to the display 219.

Further, similar to the above, operated by the remote control 100, the CPU 201 receives digital broadcast signals, obtains a transport stream of a predetermined channel, and stores the transport stream in the storage 204 as video/audio data of a broadcast program.

As described above, the device 200 is capable of receiving digital broadcast signals, outputting the broadcast program from the display 219 and the speaker 216 such that a user may watch and listen to the broadcast program, recording the broadcast program in the storage 204, and the like.

[Functional Configuration of Remote Control 100]

Figure 6:
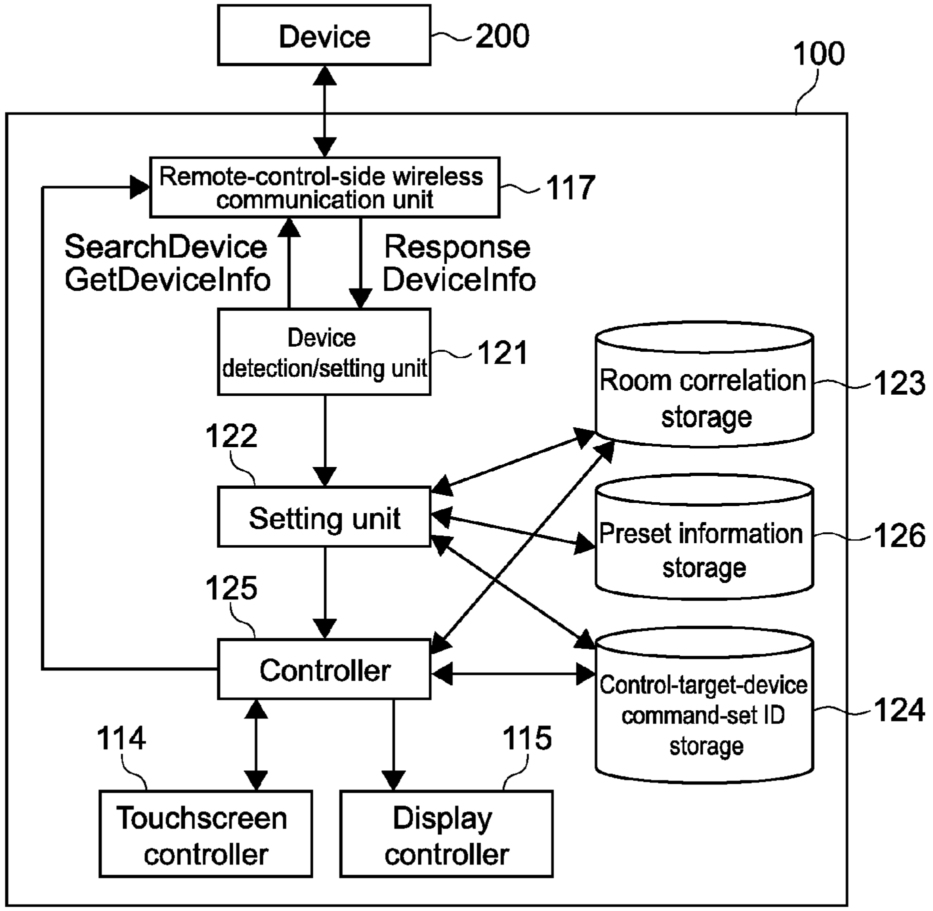
FIG. 6 is a block diagram showing the functional configuration of the remote control.

FIG. 6 is a block diagram showing the functional configuration of the remote control 100.

The remote control 100 includes the remote-control-side wireless communication unit 117 (wireless communication unit), a device detection/setting unit 121, a setting unit 122 (determining unit), room correlation storage 123, control-target-device command-set ID storage 124, a controller 125, preset information storage 126, the touchscreen controller 114 (zone selection unit), and the display controller 115 (GUI display unit).

The device detection/setting unit 121 sends a device detection request (SearchDevice) and a device information request (GetDeviceInfo) to the plurality of devices 200 installed in respective rooms by means of the remote-control-side wireless communication unit 117.

Further, the device detection/setting unit 121 receives responses (Response) from the devices 200 in response to the device detection request by means of the remote-control-side wireless communication unit 117. Then, the device detection/setting unit 121 notifies the setting unit 122 of radio-field-intensity values and device IDs included in the received responses. The "device ID" is information for uniquely identifying a device in the local.

Further, the device detection/setting unit 121 receives pieces of device information (DeviceInfo) from the devices 200 in response to the device information request by means of the remote-control-side wireless communication unit 117. The device detection/setting unit 121 notifies the setting unit 122 of device IDs and device-type IDs included in the pieces of received device information. Here, the "device-type ID" is, for example, information for uniquely identifying a device type, such as a model name, a version number, a manufacturer name, or the like.

The setting unit 122 determines the distribution of the radio-field-intensity values based on the radio-field-intensity values and the device IDs obtained from the device detection/setting unit 121. The setting unit 122 sets correlations between the respective rooms, in which the plurality of devices 200 are installed, and the respective devices 200 based on the distribution of the radio-field-intensity values. As a result, the setting unit 122 identifies installation locations of the respective plurality of devices 200 as one or more rooms. The setting unit 122 stores the set correlations in the room correlation storage 123 as a room-correlation table 400.

Further, the setting unit 122 requests the device detection/setting unit 121 to obtain device-type IDs of the respective devices 200. The setting unit 122 refers to the preset information storage 126. The setting unit 122 retrieves a command-set ID in relation with the device-type ID, which is notified by the device detection/setting unit 121. Here, the "command set" is a set of various kinds of command information for controlling the device 200. In a non-volatile memory of the remote control 100 such as, for example, the flash ROM 119, command sets corresponding to various kinds of devices are prestored so as to support the various kinds of devices. A command-set ID is preassigned to each command set. A correspondence table (not shown) of the command-set IDs and device-type IDs of corresponding devices is prestored in the preset information storage 126 set in the non-volatile memory.

The setting unit 122 generates a command-set ID table 500. In the command-set ID table 500, the device IDs and the device-type IDs obtained from the device detection/setting unit 121 are in relation with the command-set IDs retrieved from the preset information storage 126. The setting unit 122 stores the generated command-set ID table 500 in the control-target-device command-set ID storage 124.

The room correlation storage 123 stores the above-mentioned room-correlation table 400. As shown in FIG. 12, device IDs 410 of the devices 200 and room IDs 420 are in relation with each other, and registered in the room-correlation table 400. The room correlation storage 123 is set in non-volatile rewritable storage such as the flash ROM 119.

In the preset information storage 126, a table (not shown), in which device-type IDs and command-set IDs corresponding to the devices are in relation with each other, is prestored. The preset information storage 126 is set in a non-volatile memory such as the flash ROM 119 or the ROM 112.

The control-target-device command-set ID storage 124 stores the above-mentioned command-set ID table 500. As shown in FIG. 13, device IDs 530, device-type IDs 510, and command-set IDs 520 are in relation with each other, and registered in the command-set ID table 500. The control-target-device command-set ID storage 124 is set in non-volatile rewritable storage such as the flash ROM 119.

The controller 125 refers to the room-correlation table 400 stored in the room correlation storage 123. The controller 125 retrieves the room IDs 420. The controller 125 retrieves pieces of room-name data stored in the flash ROM 119. The pieces of room-name data are in relation with the retrieved room IDs 420. The controller 125 supplies the pieces of room-name data to the display controller 115. Here, a table (not shown), in which room IDs and room names of the respective rooms are in relation with each other, is stored in non-volatile rewritable storage such as the flash ROM 119. The pieces of room-name data are preinput by a user by means of the touchscreen 104.

Further, the controller 125 detects an input-operation-target room name based on data detected by the touchscreen controller 114. The controller 125 refers to the table (not shown), in which the room names and the room IDs are in relation with each other. The controller 125 retrieves a room ID in relation with the operated room name. Further, the controller 125 refers to the room-correlation table 400 stored in the room correlation storage. The controller 125 retrieves all the device IDs 410 in relation with the above-mentioned retrieved room ID 420. Further, the controller 125 retrieves the respective command-set IDs 520 in relation with the respective retrieved device IDs 410 (in FIG. 13, the device IDs 530) from the command-set ID table 500. The controller 125 supplies pieces of GUI information in relation with the respective retrieved command-set IDs 520, respectively, to the display controller 115. The pieces of GUI information and the command-set IDs are in relation with each other and prestored in non-volatile storage such as, for example, the ROM 112. Here, the "GUI information" includes GUI elements for respective operation items such as channel control and sound volume control, for example, in a case of a television receiver.

The display controller 115 generates display data of the room names, which are notified by the controller 125, and outputs the display data to the display panel 103.

Further, the display controller 115 generates GUIs based on the GUI information, which is notified by the controller 125, and outputs the GUIs to the display panel 103.

When a user operates the touchscreen 104, the touchscreen controller 114 generates digital coordinate data based on a detection signal obtained by the touchscreen 104. The touchscreen controller 114 notifies the controller 125 of the generated coordinate data as detection data.

The controller 125 detects the operated GUI element based on the detection data from the touchscreen 104. Each GUI element is in relation with each command in a command set. The controller 125 controls the remote-control-side wireless communication unit 117 to send the command corresponding to the operated GUI element.

[Functional Configuration of Device 200]

Figure 7:
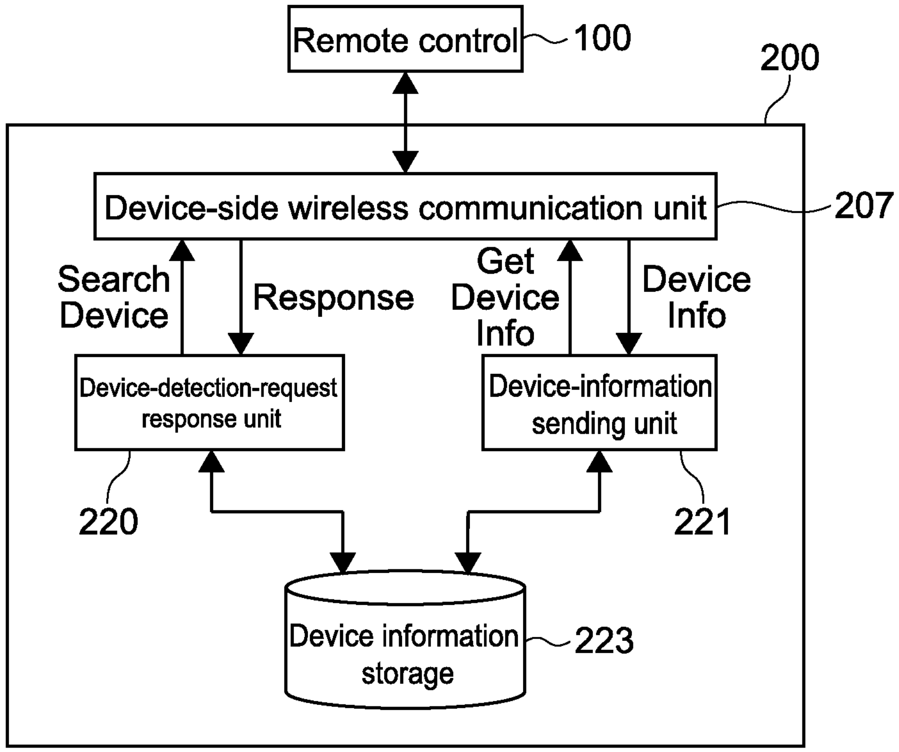
FIG. 7 is a block diagram showing the functional configuration of the device.

FIG. 7 is a block diagram showing the functional configuration of the device 200.

The device 200 includes a device-detection-request response unit 220, a device-information sending unit 221, and device information storage 223.

The device-detection-request response unit 220 receives a device detection request by means of the device-side wireless communication unit 207. Then, for example, the device-detection-request response unit 220 obtains radio-field-intensity information from the device-side wireless communication unit 207. The device-detection-request response unit 220 adds the device ID, which is stored in the device information storage 223, to the obtained radio-field-intensity value, to thereby generate a response. The device-detection-request response unit 220 returns the response to the remote control 100 by means of the device-side wireless communication unit 207.

The device-information sending unit 221 receives a device information request by means of the device-side wireless communication unit 207. The device-information sending unit 221 returns, as device information, a device-type ID and a device ID to the remote control 100 by means of the device-side wireless communication unit 207. The device-type ID and the device ID are stored in the device information storage 223.

Note that the device detection/setting unit 121 of the remote control 100 may only return a device detection request to the device 200 by means of the remote-control-side wireless communication unit 117. In this case, the device-detection-request response unit 220 adds the device-type ID and the device ID, which are stored in the device information storage 223, to the radio-field-intensity value to thereby generate a response. The device-detection-request response unit 220 sends the response to the remote control 100 by means of the device-side wireless communication unit 207. In other words, the device-detection-request response unit 220 may simultaneously send the radio-field-intensity value, the device-type ID, and the device ID to the remote control 100.

The device information storage 223 stores the device-type ID and the device ID. The device information storage 223 is set in the memory 203 or the storage 204.

Note that a television receiver is used as the device 200 in the above description. However, the device 200 may be a device other than a television receiver such as a lighting equipment, a recorder, or an audio equipment. In this case, the device 200 includes the device-side wireless communication unit 207. In addition, the functional configuration in relation with the remote control 100 is similar to the functional configuration of the above-mentioned device 200.

[Behaviors of Remote Control System 1]

Next, behaviors of the remote control system 1 will be described.

Note that the behaviors will be described in the following order:

1. setting of correlations between rooms and the respective devices 200; and
2. generation of operation window for a plurality of devices installed in each room.

[1. Setting of Correlations Between Rooms and Respective Devices 200]

Figure 8:
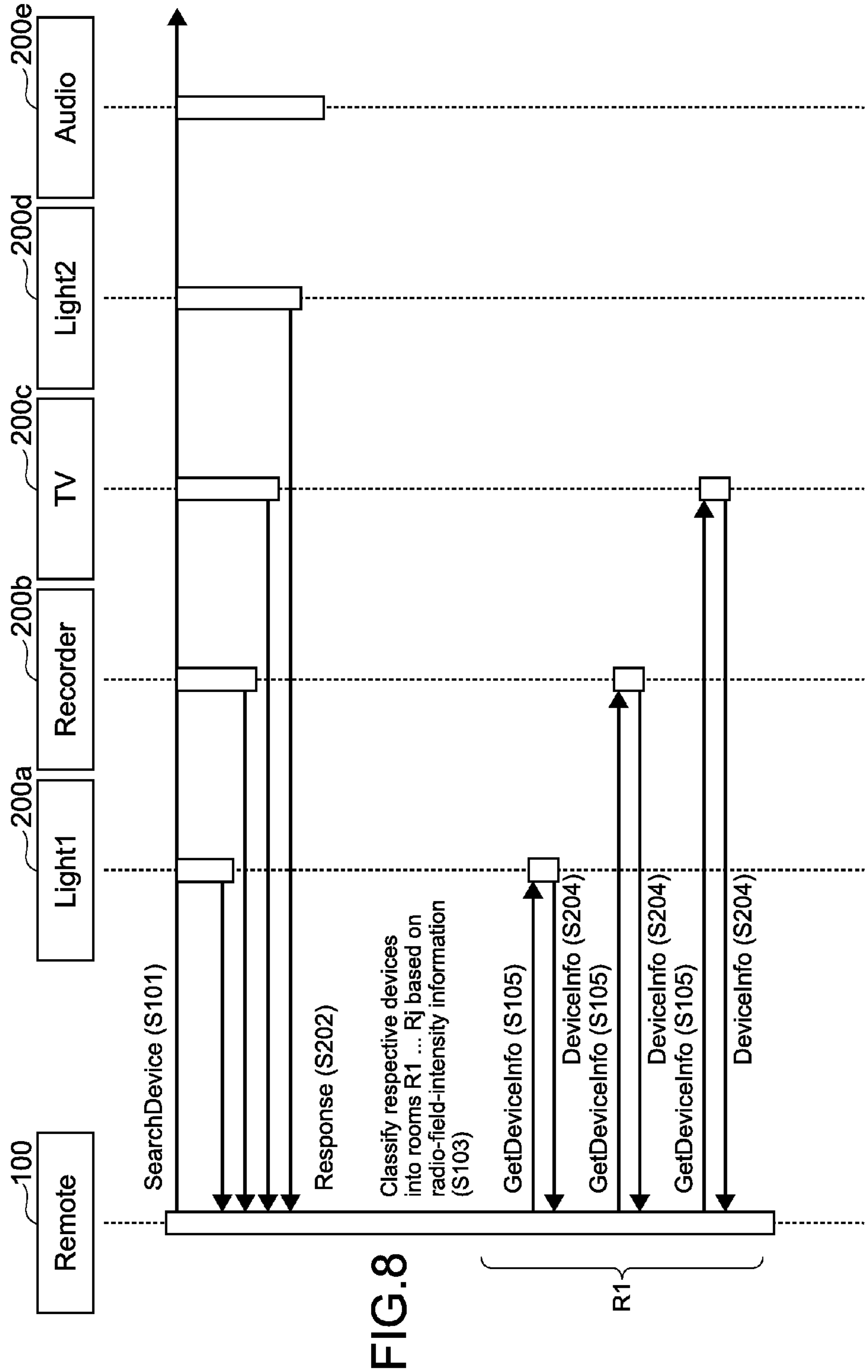
FIG. 8 is a diagram showing a processing flow of the remote control system.
Figure 9:
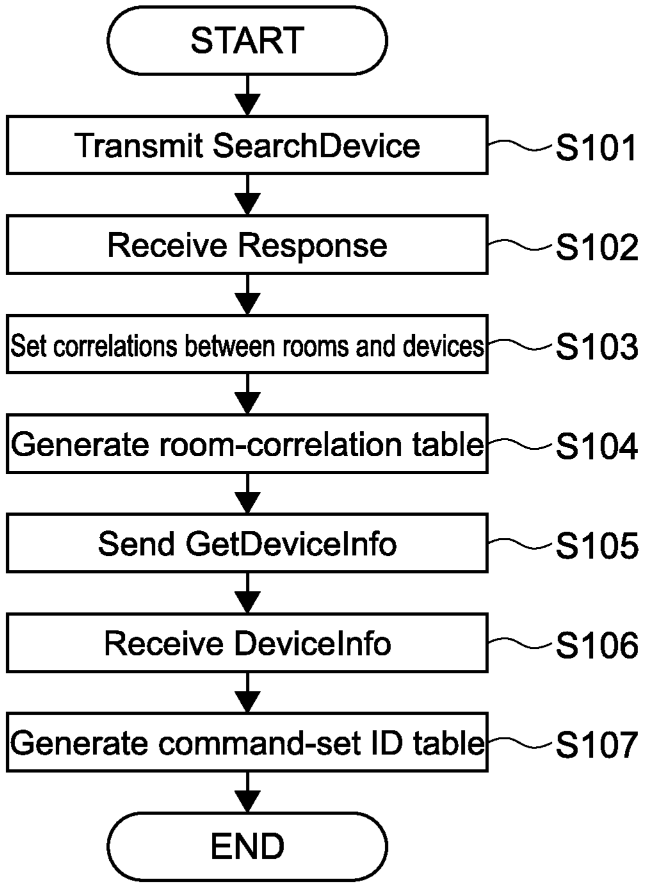
FIG. 9 is a flowchart showing behaviors of the remote control.

FIG. 8 is a diagram showing the processing flow of the remote control system 1. FIG. 9 is a flowchart showing the behavior of the remote control 100.

First, a user inputs a predetermined instruction operation to set devices, which are installed in each room, in the remote control 100. Then, the device detection/setting unit 121 of the remote control 100 is activated. The device detection/setting unit 121 transmits a device detection request by means of the remote-control-side wireless communication unit 117 (Step S101). Note that the device detection request may be transmitted irrespective of the user's instruction. For example, the device detection request may be transmitted every time the remote control 100 is powered on. Alternatively, the device detection request may be transmitted periodically and automatically.

Figure 10:
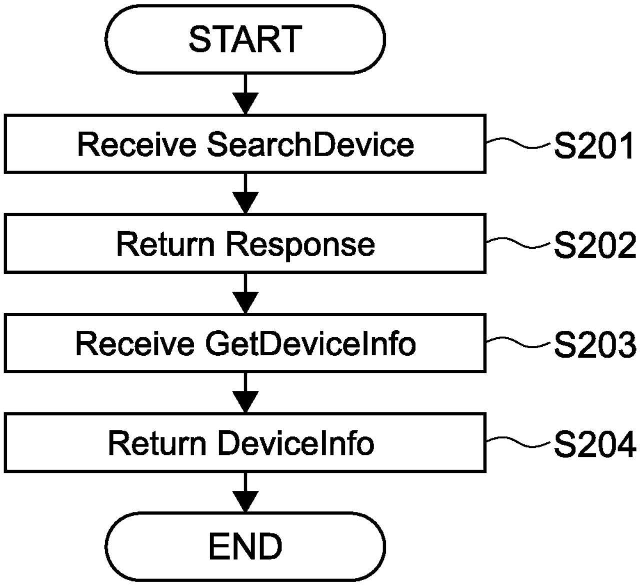
FIG. 10 is a flowchart showing behaviors of the device.

FIG. 10 is a flowchart showing the behavior of the device 200, which has received the device detection request.

The device-detection-request response unit 220 of the device 200 receives the device detection request by means of the device-side wireless communication unit 207 (Step S201). Then, the device-detection-request response unit 220 obtains, for example, radio-field-intensity information from the device-side wireless communication unit 207. The device-detection-request response unit 220 adds the device ID, which is stored in the device information storage 223, to the obtained radio-field-intensity value to thereby generate a response. The device-detection-request response unit 220 returns the response to the remote control 100 by means of the device-side wireless communication unit 207 (Step S202).

With reference to the flow of FIG. 9 again, the device detection/setting unit 121 of the remote control 100 receives the response by means of the remote-control-side wireless communication unit 117 (Step S102). Then, the device detection/setting unit 121 notifies the setting unit 122 of the radio-field-intensity value and the device ID of the device 200, which are included in the received response. Based on the obtained radio-field-intensity value and device ID of the device 200, the setting unit 122 sets correlations between the respective rooms, in which the plurality of devices 200 are installed, and the respective devices 200 (Step S103). This step aims to identify installation locations of the respective plurality of devices 200 as one or more rooms, based on the distribution of the radio-field-intensity values.

Here, the processing of setting correlations between the respective rooms, in which the plurality of devices 200 are installed, and the respective devices 200 will be described more specifically. The setting process aims to identify, by the setting unit 122, installation locations of the respective plurality of devices 200 as one or more rooms.

Figure 11:
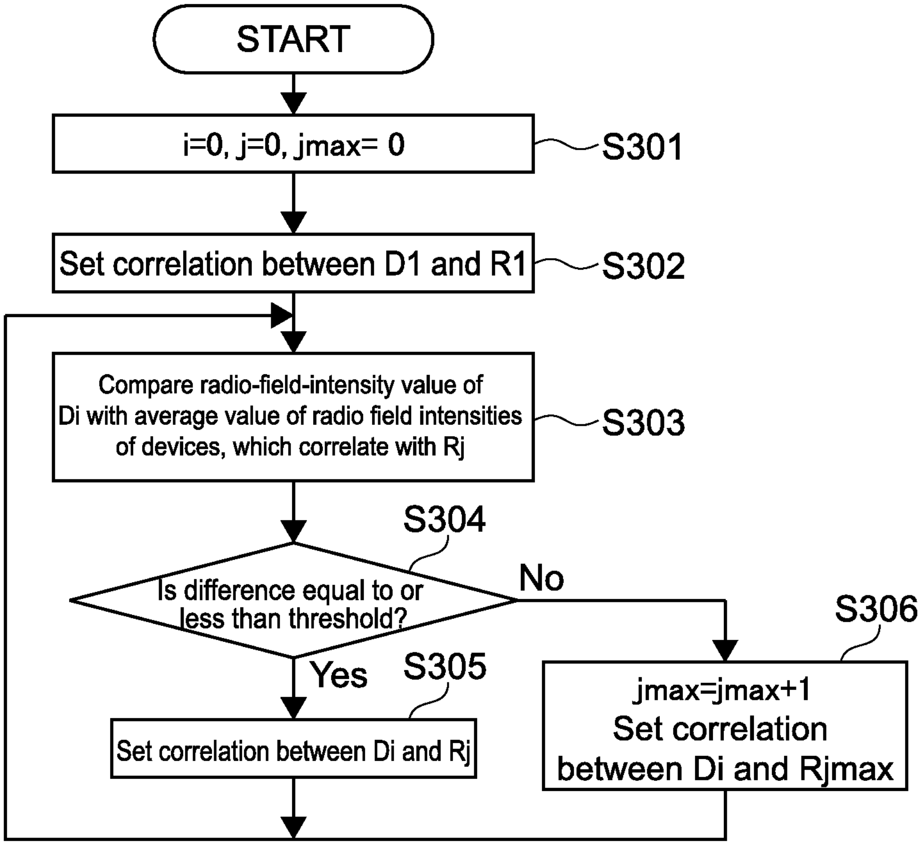
FIG. 11 is a flowchart showing processing by a setting unit.

FIG. 11 is a flowchart showing processing by the setting unit 122.

Di represents a device, Rj represents a room, and jmax represents the number of rooms. i, j, and jmax are variables. First, as initialization, each of i, j, and jmax is set to "0" (Step S301). The setting unit 122 estimates the correlations between the rooms and the devices, from the following viewpoint. That is, respective radio-field-intensity values measured by a plurality of devices Di, which are installed in the same room, are the similar values.

That is, the device detection/setting unit 121 firstly receives a response from a device Dl. The setting unit 122 obtains the radio-field-intensity value and the device ID of the device D1 from the device-side wireless communication unit 207 via the device detection/setting unit 121. The setting unit 122 sets the correlation between the device D1 and a room R1 (Step S302). After that, the device detection/setting unit 121 receives responses from devices Di (i>1). The correlation between a device Di (i>1) and a room Rj is set as follows.

The setting unit 122 compares the newly-obtained radio-field-intensity value of the device Di (i>1) with the average value of the radio field intensities of one or more devices in each room Rj. The setting unit 122 obtains the difference between the newly-obtained radio-field-intensity value and the average value (Step S303). If the difference between the radio-field-intensity value of the device Di (i>1) and the average value of the radio field intensities of one or more devices in a certain room Rj is equal to or less than a threshold (Step S304, Yes), the setting unit 122 determines that the device Di is installed in the room Rj. The setting unit 122 sets the correlation between the device Di and the room Rj (Step S305).

Meanwhile, if the difference between the radio-field-intensity value of the device Di (i>1) and the average value of every room Rj is larger than the threshold (Step S304, No), the setting unit 122 sets a new room Rj (jmax+1). The setting unit 122 sets the correlation between the room Rj (jmax+1) and the device Di (i>1) (Step S306).

The setting unit 122 repeats the above-mentioned processing with respect to all the devices, whose responses are received by the device detection/setting unit 121. As a result, the setting unit 122 sets correlations between all the devices Di, whose responses are received, and the rooms Rj. In this manner, the setting unit 122 identifies the installation locations of the respective plurality of devices 200 as one or more rooms.

The flows of FIG. 9 and FIG. 10 will be described again.

As described above, the setting unit 122 of the remote control 100 sets the correlations between the respective rooms and the respective devices 200 (Step S103). This step aims to identify the installation locations of the respective plurality of devices 200 as one or more rooms. The setting unit 122 stores the correlation information in the room correlation storage 123 as the room-correlation table 400 (Step S104). As shown in FIG. 12, in the room-correlation table 400, the device ID 410 and the room ID 420 of the device 200 are in relation with each other and registered. As the room ID 420, for example, the above-mentioned Rj may be used.

Subsequently, the setting unit 122 requests the device detection/setting unit 121 to obtain the device-type IDs of the respective devices 200, which are registered in the room-correlation table 400. The "device-type ID" is, for example, information for uniquely identifying a device type such as a model name, a version number, a manufacturer name, or the like. The device detection/setting unit 121 receives the request. Then, the device detection/setting unit 121 sends a device information request to the respective devices 200 by means of the remote-control-side wireless communication unit 117 (Step S105).

With reference to the flow of FIG. 10, the device-information sending unit 221 of the device 200 receives the device information request by means of the device-side wireless communication unit 207 (Step S203). Then, the device-information sending unit 221 generates device information. The device information includes the device-type ID and the above-mentioned device ID, which are stored in the device information storage 223. The device-information sending unit 221 returns the device information to the remote control 100 by means of the device-side wireless communication unit 207 (Step S204).

With reference to the flow of FIG. 9 again, the device detection/setting unit 121 of the remote control 100 receives the device information by means of the remote-control-side wireless communication unit 117 (Step S106). The device detection/setting unit 121 notifies the setting unit 122 of the device ID and the device-type ID, which are included in the received device information. The setting unit 122 refers to the preset information storage 126. The setting unit 122 retrieves a command-set ID in relation with the notified device-type ID.

The setting unit 122 generates the command-set ID table 500. In the command-set ID table 500, the device ID and the device-type ID obtained from the device detection/setting unit 121 are in relation with the command-set ID retrieved from the preset information storage 126. The setting unit 122 stores the generated command-set ID table 500 in the control-target-device command-set ID storage 124 (Step S107). As shown in FIG. 13, in the command-set ID table 500, the device ID 530 and the device-type ID 510, which are obtained from the device detection/setting unit 121, and the command-set ID 520, which is retrieved from the preset information storage 126, are in relation with each other and registered. In the above-mentioned manner, in the control-target-device command-set ID storage 124, the device IDs 530, the device-type IDs 510, and the command-set IDs 520 are in relation with each other and stored. The device IDs 530, the device-type IDs 510, and the command-set IDs 520 relate to the plurality of devices 200 installed in each room.

According to the above-mentioned processing, the remote control 100 sets the correlations between the respective rooms, in which the plurality of devices 200 are installed, and the respective devices 200. After that, a user inputs pieces of room-name data (living room, bed room, etc.) by using the touchscreen 104. The pieces of room-name data are data of names of the rooms, in which the respective devices 200 are installed. A table (not shown), in which the room IDs and the input pieces of room-name data of the respective rooms are in relation with each other, is stored in non-volatile rewritable storage such as the flash ROM 119.

[2. Generation of Operation Window for a Plurality of Devices Installed in each Room]

Subsequently, the display controller 115 of the remote control 100 generates display data output to the display panel 103. The generation processing will be described.

Figure 14:
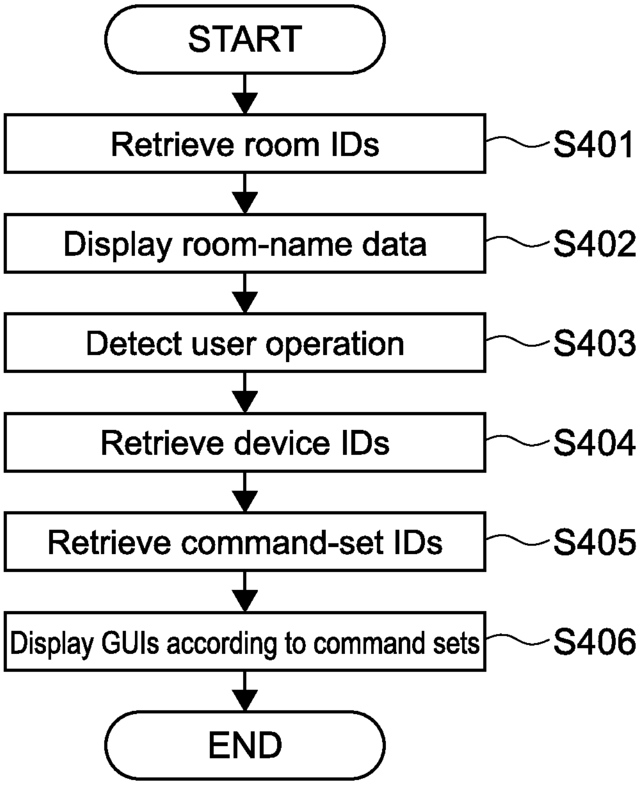
FIG. 14 is a flowchart showing processing to generate display data.

FIG. 14 is a flowchart showing display data generation processing.

First, the controller 125 refers to the room-correlation table 400 stored in the room correlation storage 123. The controller 125 retrieves all the room IDs 420 registered in the room-correlation table 400 (Step S401). A predetermined detection signal obtained by the touchscreen 104 may trigger the behavior. In the example of FIG. 12, the controller 125 retrieves the room IDs 420 "R1" and "R2". The controller 125 retrieves pieces of room-name data stored in the flash ROM 119 in relation with the retrieved room IDs 420. The controller 125 supplies the pieces of room-name data to the display controller 115.

Figure 15:
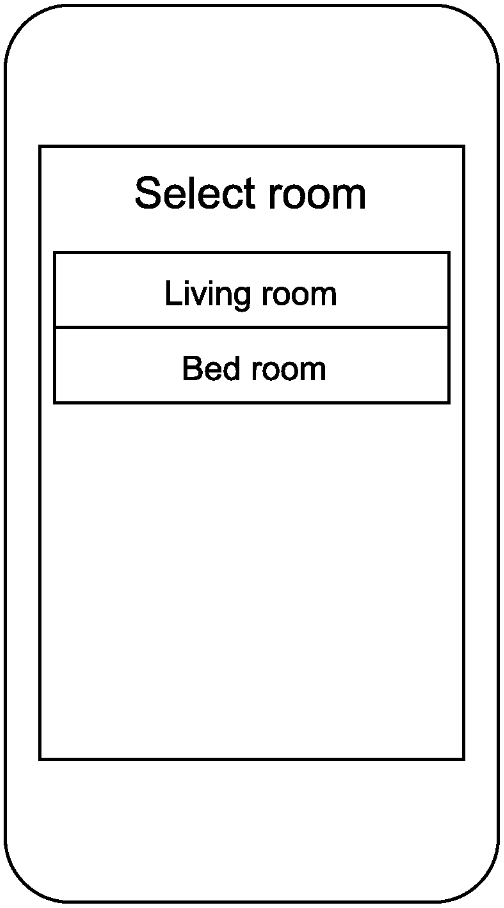
FIG. 15 is a diagram showing GUIs displayed on a display panel.

The display controller 115 generates display data of the room-name data notified by the controller 125. The display controller 115 outputs the display data to the display panel 103 (Step S402). For example, as shown in FIG. 15, pieces of room-name data "living room" and "bed room" are displayed on the display panel 103. The pieces of room-name data "living room" and "bed room" are in relation with the room IDs "R1" and "R2", respectively.

A user operates the touchscreen 104 in order to select an arbitrary room. Then, the touchscreen controller 114 generates digital coordinate data based on a detection signal obtained by the touchscreen 104. The touchscreen controller 114 notifies the controller 125 of the generated coordinate data as detection data (Step S403).

The controller 125 detects the operated room name based on the detection data from the touchscreen controller 114. The controller 125 refers to a table (not shown), in which pieces of room-name data and room IDs are in relation with each other. The controller 125 retrieves a room ID, which is in relation with the operated room-name data. Further, the controller 125 refers to the room-correlation table 400 stored in the room correlation storage 123. The controller 125 retrieves the device IDs 410, which are in relation with the above-mentioned retrieved room ID 420 (Step S404). For example, in FIG. 15, the display data "living room" of room-name data is operated. In this case, the controller 125 retrieves the device IDs 410 "D1", "D2", and "D3" from the room-correlation table 400. The device IDs 410 "D1", "D2", and "D3" are in relation with the room ID "R1". The room ID "R1" corresponds to the room-name data "living room".

Subsequently, the controller 125 retrieves the command-set IDs 520 from the command-set ID table 500 stored in the control-target-device command-set ID storage 124 (Step S405). The command-set IDs 520 are in relation with the retrieved device IDs 410 (device IDs 530 in FIG. 13) "D1", "D2", and "D3", respectively. The controller 125 supplies pieces of GUI information to the display controller 115. The pieces of GUI information are in relation with the retrieved command-set IDs 520, respectively. The pieces of GUI information and the command-set IDs are in relation with each other, and prestored in non-volatile storage such as the ROM 112, for example.

Figure 16:
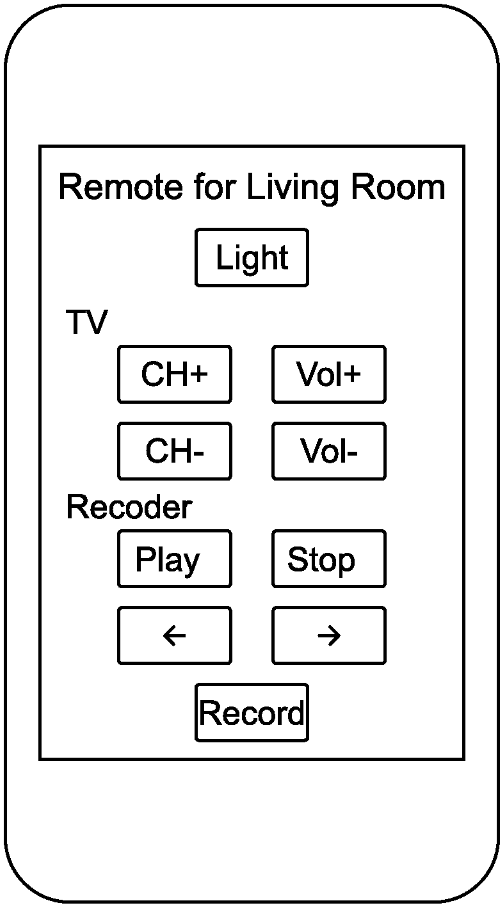
FIG. 16 is a diagram showing GUIs displayed on the display panel.

The display controller 115 generates GUIs based on the notified GUI information. The display controller 115 outputs the GUIs to the display panel 103 (Step S406). As a result, as shown in FIG. 16, operation GUIs of one or more devices are displayed on the display panel 103. The installation locations of the one or more devices are identified as one room. In the example shown in FIG. 16, the GUIs, for operating a plurality of devices (lighting, television receiver, and recorder) installed in the living room, are displayed on the display panel 103.

A user operates the touchscreen 104. Then, the touchscreen controller 114 generates digital coordinate data based on a detection signal obtained by the touchscreen 104. The touchscreen controller 114 notifies the controller 125 of the generated coordinate data as detection data.

The controller 125 detects the operated GUI element based on the detection data from the touchscreen controller 114. The GUI elements are in relation with commands in a command set, respectively. The controller 125 controls the remote-control-side wireless communication unit 117 to send a command, which corresponds to the operated GUI element.

As described above, according to this embodiment, the correlations between the respective rooms and the respective devices 200 are set. By using the correlations, the respective installation locations of the plurality of devices are identified as one or more rooms. Because of this, a user selects not a certain device 200 but a room. Because a user selects a room, the remote control 100 is capable of seamlessly switching and controlling the plurality of control-target devices 200 in the room. As a result, user-operability and user-friendliness are improved.

Further, according to the technologies of Patent Documents 1 and 2, a control-target device is determined according to the current location of the remote control. Because of this, it is necessary for the remote control to obtain the positional relation between a remote control and a control-target device, every time a user operates the remote control or every predetermined period of time. Because of this, even if a user wishes to operate the remote control promptly, the positional relation may be obtained first. As a result, the remote control may not start to control a device promptly. For example, a user, who holds a remote control in his hand, walks from room to room. The user tries to use the remote control in the destination room. In this case, it is necessary for the remote control to, first, obtain the positional relation between the remote control and a control-target device in the destination room. Because of this, the remote control may not control a device promptly. It is a nuisance for the user. However, according to this embodiment, the remote control 100 stores the correlation information between the respective rooms and the respective devices 200 in the room correlation storage 123, in order to identify the installation locations of the plurality of devices as one or more rooms. Once the correlations are stored, a room, in which a control-target device is installed, may be called up based on the correlations, from the next time and on. As a result, user-operability and user-friendliness are improved.

According to the above description of this embodiment, installation locations of devices are identified as one or more rooms. However, the present technology is not necessarily limited to the embodiment, in which installation locations of devices are identified as one or more rooms. According to the present technology, installation locations may be identified as one or more space units other than rooms (for example, one or more zones, which are sectioned based on dimensions, or the like).

<Second Embodiment>

According to the first embodiment, the remote control 100 identifies installation locations of the plurality of devices 200 as one or more rooms, based on responses including radio-field-intensity values. The radio-field-intensity values are pieces of measurement information, which reflect installation locations of the plurality of devices 200. Meanwhile, according to the second embodiment, the remote control identifies installation locations of the plurality of devices 200 as one or more rooms, based on responses including GPS information. The pieces of GPS information are pieces of measurement information, which reflect installation locations of the plurality of devices 200.

In the following description, configurations and the like similar to those of the first embodiment are denoted by similar referential symbols, and the description thereof will be omitted. Hereinafter, different points will mainly be described.

[Hardware Configuration of Device 200A]

Figure 17:
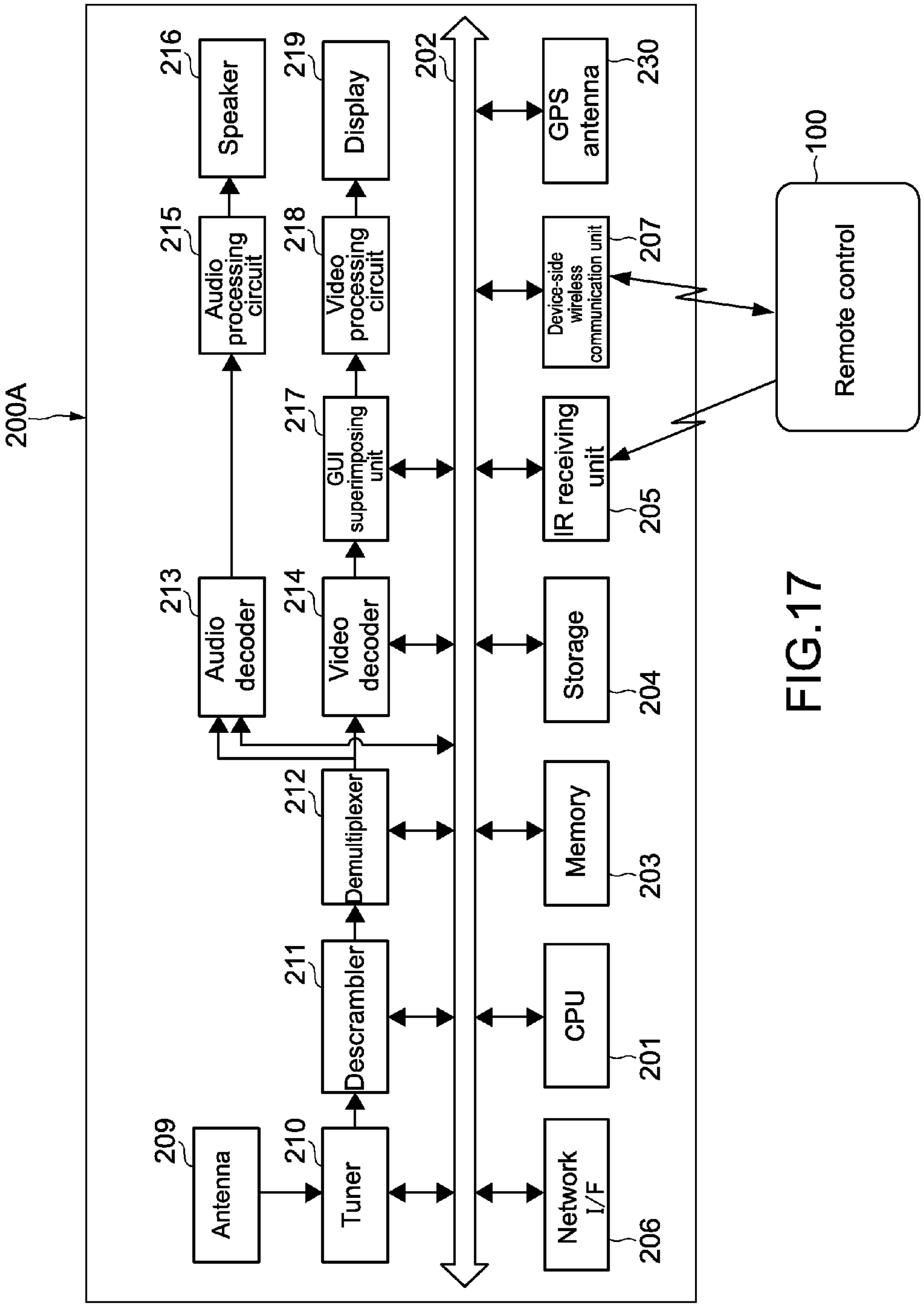
FIG. 17 is a diagram showing the hardware configuration of a device according to a second embodiment.

FIG. 17 is a diagram showing the hardware configuration of a device 200A of the second embodiment.

As shown in FIG. 17, the device 200A of the second embodiment is a device, in which a GPS antenna 230 is added to the device 200 of the first embodiment.

The GPS antenna 230 receives a radio wave transmitted from a GPS (Global Positioning System) satellite.

[Functional Configuration of Device 200A]

Figure 18:
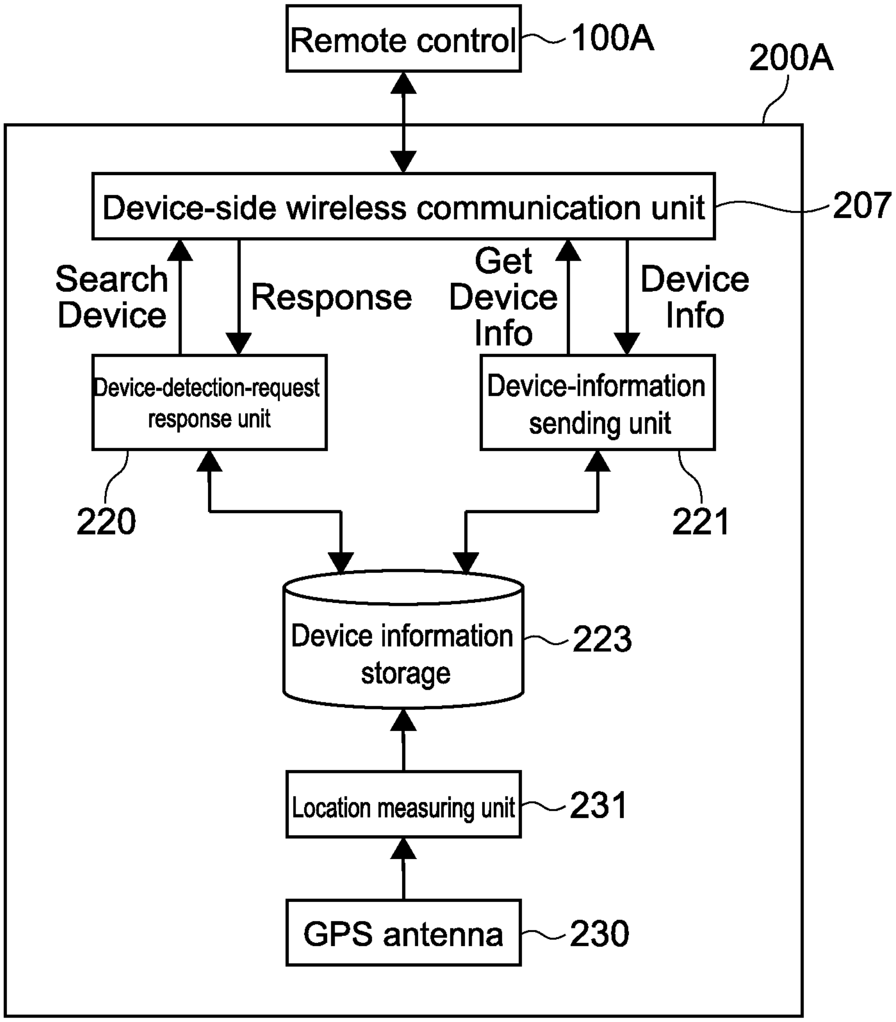
FIG. 18 is a diagram showing the functional configuration of the device.

FIG. 18 is a diagram showing the functional configuration of the device 200A.

As shown in FIG. 18, the device 200A is a device, in which the GPS antenna 230 and a location measuring unit 231 are added to the functional blocks of the device 200 of the first embodiment.

The location measuring unit 231 measures the location of the device 200A, based on a received signal from the GPS satellite received by the GPS antenna 230. The location measuring unit 231 stores GPS information in the device information storage 223. The GPS information shows the measured location of the device 200A.

The device-detection-request response unit 220 receives a device detection request by means of the device-side wireless communication unit 207. Then, the device-detection-request response unit 220 retrieves the GPS information stored in the device information storage 223. The device-detection-request response unit 220 adds the device ID stored in the device information storage 223 to the retrieved GPS information, to thereby generate a response. The device-detection-request response unit 220 sends the response to a remote control 100A by means of the device-side wireless communication unit 207.

[Functional Configuration of Remote Control 100A]

The device detection/setting unit 121 notifies the setting unit 122 of the GPS information and the device ID of the device 200A. The GPS information and the device ID are included in the response received by means of the remote-control-side wireless communication unit 117.

The setting unit 122 determines the distribution of the pieces of GPS information based on the obtained pieces of GPS information and the obtained device IDs. The setting unit 122 sets correlations between the respective rooms, in which the plurality of devices 200 are installed, and the respective devices 200 based on the distribution of the pieces of GPS information. As a result, the setting unit 122 identifies installation locations of the respective plurality of devices 200 as one or more rooms.

[Behaviors of Remote Control System]

Next, behaviors of the remote control system will be described. Here, the remote control 100A sets correlations between the respective rooms, in which the plurality of devices 200A are installed, and the respective devices 200A. This setting process aims to identify installation locations of the respective plurality of devices 200A as one or more rooms.

The device detection/setting unit 121 of the remote control 100A transmits a device detection request to the plurality of devices 200A installed in the respective rooms by means of the remote-control-side wireless communication unit 117 (FIG. 9, Step S101).

Figure 19:
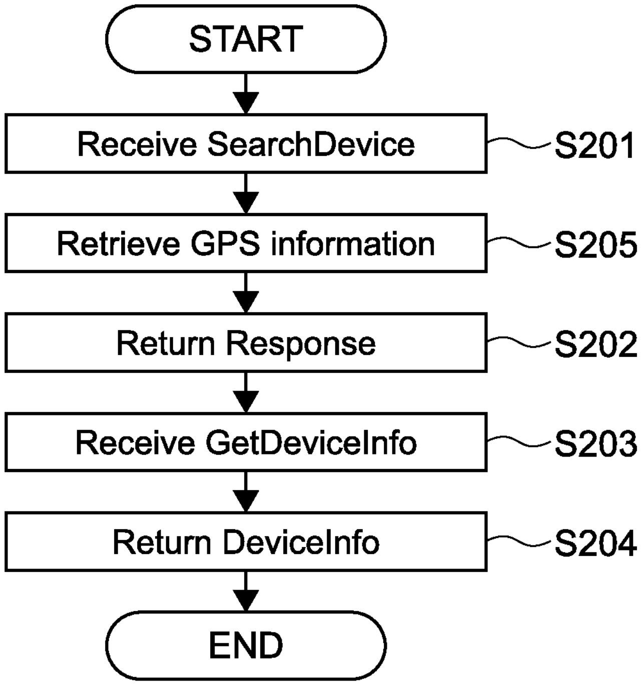
FIG. 19 is a flowchart showing behaviors of the device.

FIG. 19 is a flowchart showing the behavior of the device 200A.

The device-detection-request response unit 220 of the device 200A receives the device detection request by means of the device-side wireless communication unit 207 (Step S201). Then, the device-detection-request response unit 220 retrieves GPS information stored in the device information storage 223 (Step S205). The device-detection-request response unit 220 adds the device ID, which is stored in the device information storage 223, to the retrieved GPS information, to thereby generate a response. The device-detection-request response unit 220 returns the response to the remote control 100A by means of the device-side wireless communication unit 207 (Step S202).

With reference to the flow of FIG. 9, the device detection/setting unit 121 of the remote control 100A receives the response by means of the remote-control-side wireless communication unit 117 (Step S102). Then, the device detection/setting unit 121 notifies the setting unit 122 of the GPS information and the device ID of the device 200A, which are included in the received response. Based on the obtained GPS information and device ID of the device 200A, the setting unit 122 sets correlations between the respective rooms, in which the plurality of devices 200A are installed, and the respective devices 200A (Step S103). This step aims to identify installation locations of the respective plurality of devices 200A as one or more rooms, based on the distribution of the pieces of GPS information. That is, the setting unit 122 estimates that devices, which have similar pieces of GPS information, are installed in the same room. The processing may be executed similar to the processing of FIG. 11. Note that, in Step S303, the setting unit 122 compares the newly-obtained GPS information value of the device Di with the average value of the GPS information values of one or more devices in each room Rj. The setting unit 122 obtains the difference between the newly-obtained GPS information value and the average value.

Behaviors of the remote control 100A thereafter (Step S104 and the following steps) and behaviors of the device 200A thereafter (Step S203 and the following step) are similar to the behaviors in the first embodiment.

As described above, according to this embodiment also, the correlations between the respective rooms and the respective devices 200A are set. By using the correlations, the respective installation locations of the plurality of devices are identified as one or more rooms. Because of this, a user selects not a certain device 200A but a room. Because a user selects a room, the remote control 100 is capable of seamlessly switching and controlling the plurality of control-target devices 200A in the room. As a result, user-operability and user-friendliness are improved.

MODIFIED EXAMPLE 1

Figure 20:
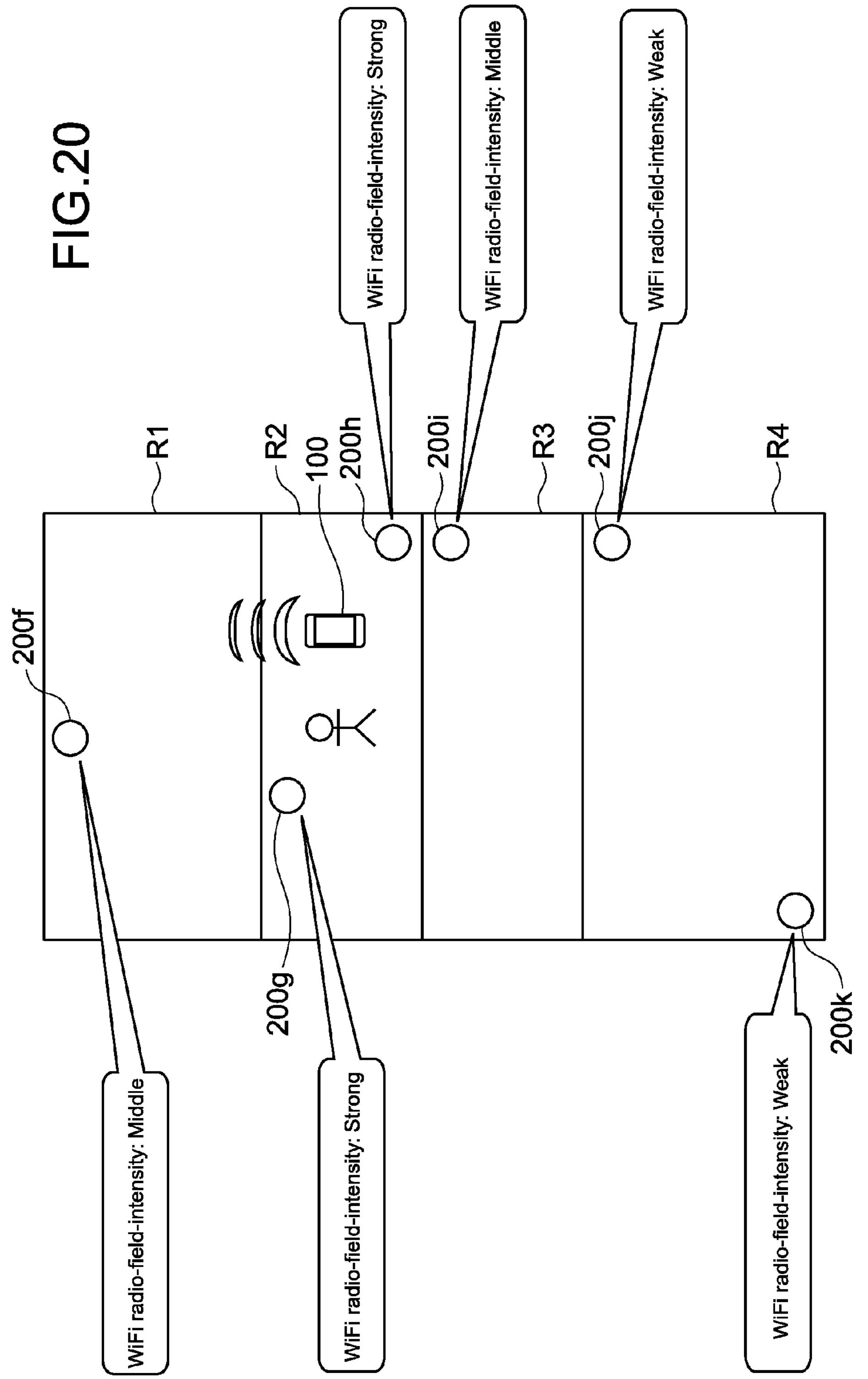
FIG. 20 is a diagram for illustrating the wireless communication system between the devices and the remote control.

Meanwhile, in the first embodiment, installation locations of a plurality of devices are identified as one or more rooms based on radio field intensities. In some cases, identification may not be successfully performed according to this method. For example, as shown in FIG. 20, there are a room R1 and a room R3 on both sides of a room R2, in which the remote control 100 is installed. In this case, identification may not be successfully performed. In this case, the rooms R1 and R3 are likely to be determined as one room. Further, a plurality of devices 200*f* and 200*i* installed in the rooms R1 and R3 are likely to be determined such that they are installed in one room. In such a case, the device detection/setting unit 121 of the remote control 100 is activated in the room R1 or in a room R4. Accordingly, the four rooms R1, R2, R3, and R4 may be identified.

Further, another method will be described. In this method, an access point (hereinafter, AP) in the wireless LAN is additionally used. Here, the AP sends a device detection request (SearchDevice) to a plurality of devices 200 installed in the respective rooms, in response to a request from the remote control 100. The AP receives responses (Response) from the devices 200. The AP replies radio-field-intensity values and device IDs to the remote control 100. The radio-field-intensity values and the device IDs are included in the responses (Response) received from the plurality of devices 200. The remote control 100 identifies installation locations of the respective devices 200 as one or more rooms, based on the radio-field-intensity values of the respective device 200 replied from the AP, and based on the radio-field-intensity values of the respective device 200 obtained by the remote control 100 at first hand.

Figure 21:
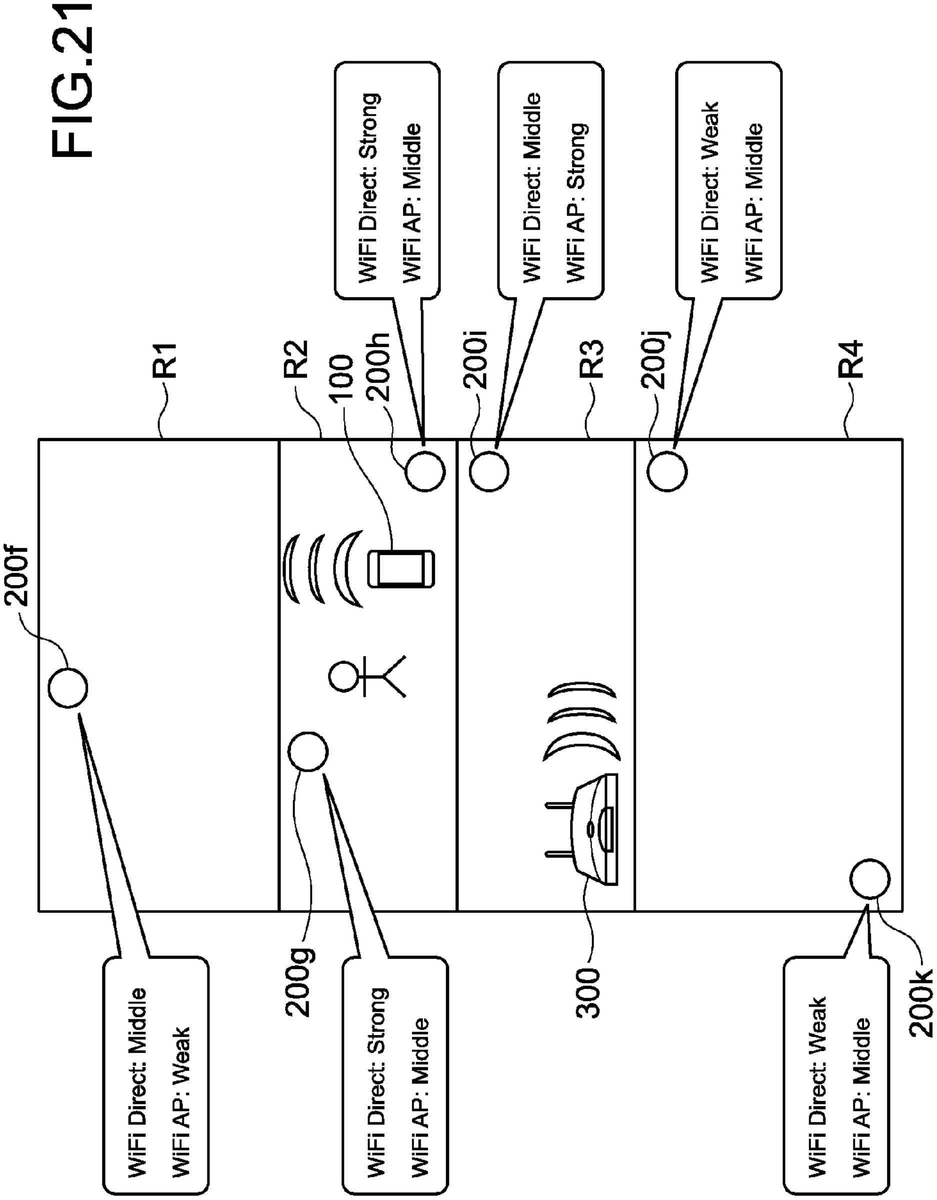
FIG. 21 is a diagram for illustrating a wireless communication system between devices and a remote control according to a modified example 1.

FIG. 21 is a diagram showing correlations of radio field intensities of the respective devices 200. In FIG. 21, the remote control 100 is in the room R2, and an AP 300 is installed in the room R3, which is next to the room R2.

Here, radio-field-intensity values of the respective devices 200 are determined with such a resolution, with which it is possible to determine how many rooms (0 or more) exist between each device 200 and the room R2, in which the remote control 100 as a radio wave source is installed, and how many rooms (0 or more) exist between the device 200 and the room R3, in which the AP 300 is installed. For ease of explanation, here, radio-field-intensity values of the respective device 200 are classified into three levels "strong", "middle", and "weak". The rooms are identified based on radio-field-intensity values classified into those three levels.

In FIG. 21, there are four rooms R1, R2, R3, and R4 side by side. A device 200*f* is installed in the room R1. Two devices 200*g* and 200*h* are installed in the room R2. A device 200*i* is installed in the room R3. Two devices 200*j* and 200*k* are installed in the room R4.

Further, the remote control 100 is in the room R2, and the AP 300 is installed in the room R3. The remote control 100 finally obtains the following radio-field-intensity values of the respective devices 200*f* to 200*k*. In the following, the first value is a radio-field-intensity value, in a case where the radio wave source is the remote control 100. The second value is a radio-field-intensity value, in a case where the radio wave source is the AP 300.

The radio field intensities of the device 200*f*: first value="middle", second value="weak", The radio field intensities of the device 200*g*: first value="strong", second value="middle", The radio field intensities of the device 200*h*: first value="strong", second value="middle", The radio field intensities of the device 200*i*: first value="middle", second value="strong", The radio field intensities of the device 200*j*: first value="weak", second value="middle", and The radio field intensities of the device 200*k*: first value="weak", second value="middle".

The setting unit 122 of the remote control 100 identifies the installation locations of the respective devices as one or more rooms based on the combinations of the first value and the second value. For example, one room (room R1) is assigned to the combination of the radio field intensities of the device 200*f* (combination of first value="middle" and second value="weak"). It is determined that the device 200*f* is installed in the room R1. Further, another room (room R2) is assigned to the combination of the radio field intensities of each of the devices 200*g* and 200*h* (combination of first value="strong" and second value="middle"). It is determined that the devices 200*g* and 200*h* are installed in the room R2. Similarly, one room (room R3) is assigned to the combination of the radio field intensities of the device 200*i* (combination of first value="middle" and second value="strong"). It is determined that the device 200*i* is installed in the room R3. Further, another room (room R4) is assigned to the combination of the radio field intensities of each of the devices 200*j* and 200*k* (combination of first value="weak" and second value="middle"). It is determined that the devices 200*j* and 200*k* are installed in the room R4.

As described above, according to the modified example 1, the AP 300 sends the device detection request (SearchDevice) to the plurality of devices 200 installed in the respective rooms, in response to the request from the remote control 100. Further, the AP 300 receives the responses (Response) from the devices 200, and replies them to the remote control 100. As a result, in various room-layouts, it is possible to identify installation locations of a plurality of devices as one or more rooms.

Figure 22:
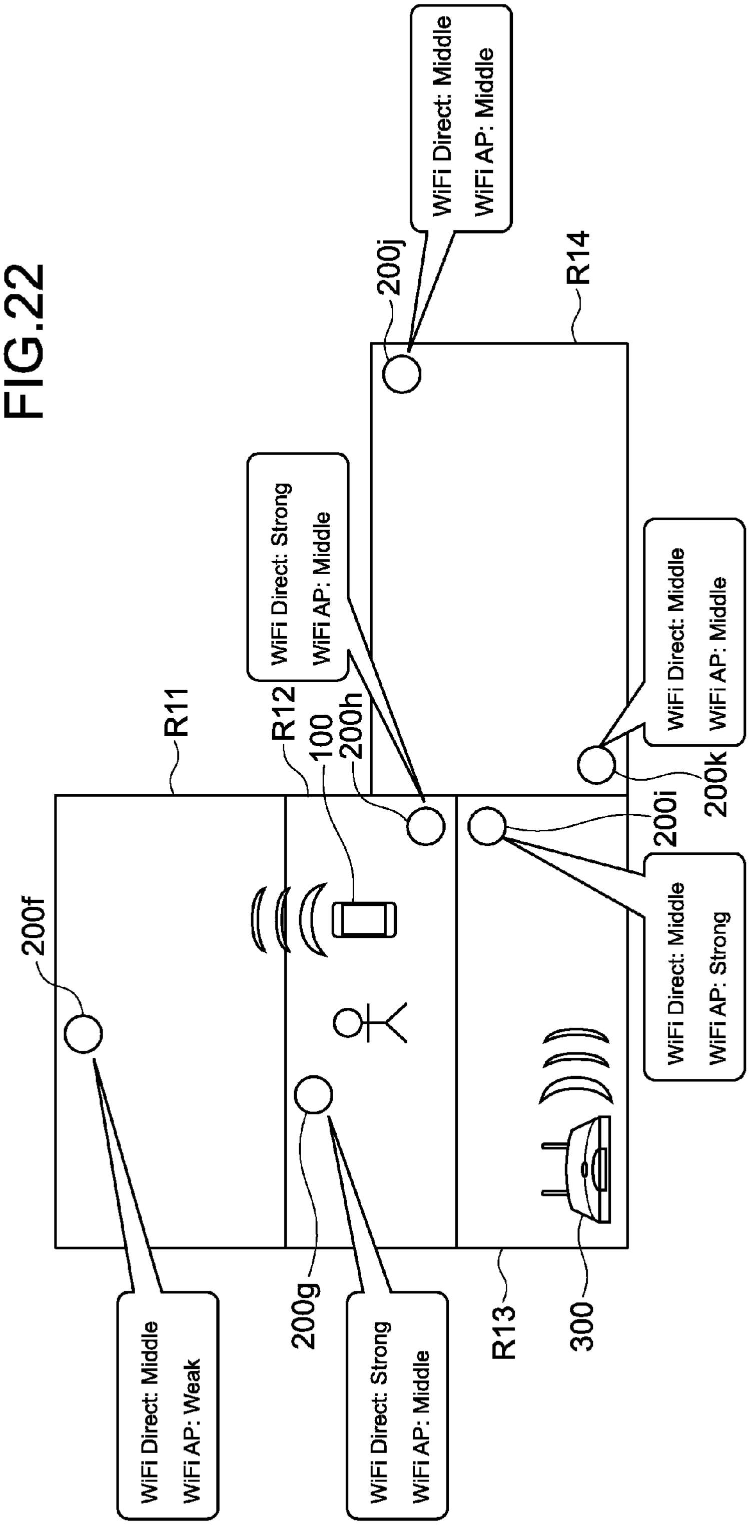
FIG. 22 is a diagram for illustrating the wireless communication system between the devices and the remote control according to the modified example 1.

Meanwhile, in the first embodiment, installation locations of a plurality of devices are identified as one or more rooms based on radio field intensities. In the case of FIG. 22, identification may not be successfully performed according to this method. As shown in FIG. 22, there are a room R11, a room R13, and a room R14 next to a room R12, in which the remote control 100 is installed. The rooms R11, R13, and R14 are located in three different directions relative to the room R12, respectively. In this case, identification may not be successfully performed. In this case, the rooms R11, R13, and R14 are likely to be determined as one room. Further, a plurality of devices 200*f*, 200*i*, 200*j*, and 200*k* installed in the rooms R11, R13, and R14 are likely to be determined such that they are installed in one room.

In FIG. 22, there are four rooms, in which the rooms R11, R12, and R13 are located side by side, and the room R14 is located next to the rooms R12 and R13. The device 200*f* is installed in the room R11. The two devices 200*g* and 200*h* are installed in the room R12. The device 200*i* is installed in the room R13. The two devices 200*j* and 200*k* are installed in the room R14.

Further, the remote control 100 is in the room R12, and the AP 300 is installed in the room R13. The remote control 100 finally obtains the following radio-field-intensity values of the respective devices 200*f* to 200*k*. In the following, the first value is a radio-field-intensity value, in a case where the radio wave source is the remote control 100. The second value is a radio-field-intensity value, in a case where the radio wave source is the AP 300.

The radio field intensities of the device 200*f*: first value="middle", second value="weak", The radio field intensities of the device 200*g*: first value="strong", second value="middle", The radio field intensities of the device 200*h*: first value="strong", second value="middle", The radio field intensities of the device 200*i*: first value="middle", second value="strong", The radio field intensities of the device 200*j*: first value="middle", second value="middle", and The radio field intensities of the device 200*k*: first value="middle", second value="middle".

The setting unit 122 of the remote control 100 identifies the installation locations of the respective devices as one or more rooms based on the combinations of the first value and the second value. For example, one room (room R1) is assigned to the combination of the radio field intensities of the device 200*f* (combination of first value="middle" and second value="weak"). It is determined that the device 200*f* is installed in the room R1. Further, another room (room R2) is assigned to the combination of the radio field intensities of each of the devices 200*g* and 200*h* (combination of first value="strong" and second value="middle"). It is determined that the devices 200*g* and 200*h* are installed in the room R2. Similarly, one room (room R3) is assigned to the combination of the radio field intensities of the device 200*i* (combination of first value="middle" and second value="strong"). It is determined that the device 200*i* is installed in the room R3. Further, another room (room R4) is assigned to the combination of the radio field intensities of each of the devices 200*j* and 200*k* (combination of first value="middle" and second value="middle"). It is determined that the devices 200*j* and 200*k* are installed in the room R4. In such a room-layout, installation locations of a plurality of devices may be identified as one or more rooms.

MODIFIED EXAMPLE 2

In the modified example 1, installation locations of a plurality of devices are identified as one or more rooms by using Wi-Fi Direct and an AP in a wireless LAN. Alternatively, a plurality of APs may be used without using Wi-Fi Direct.

Figure 23:
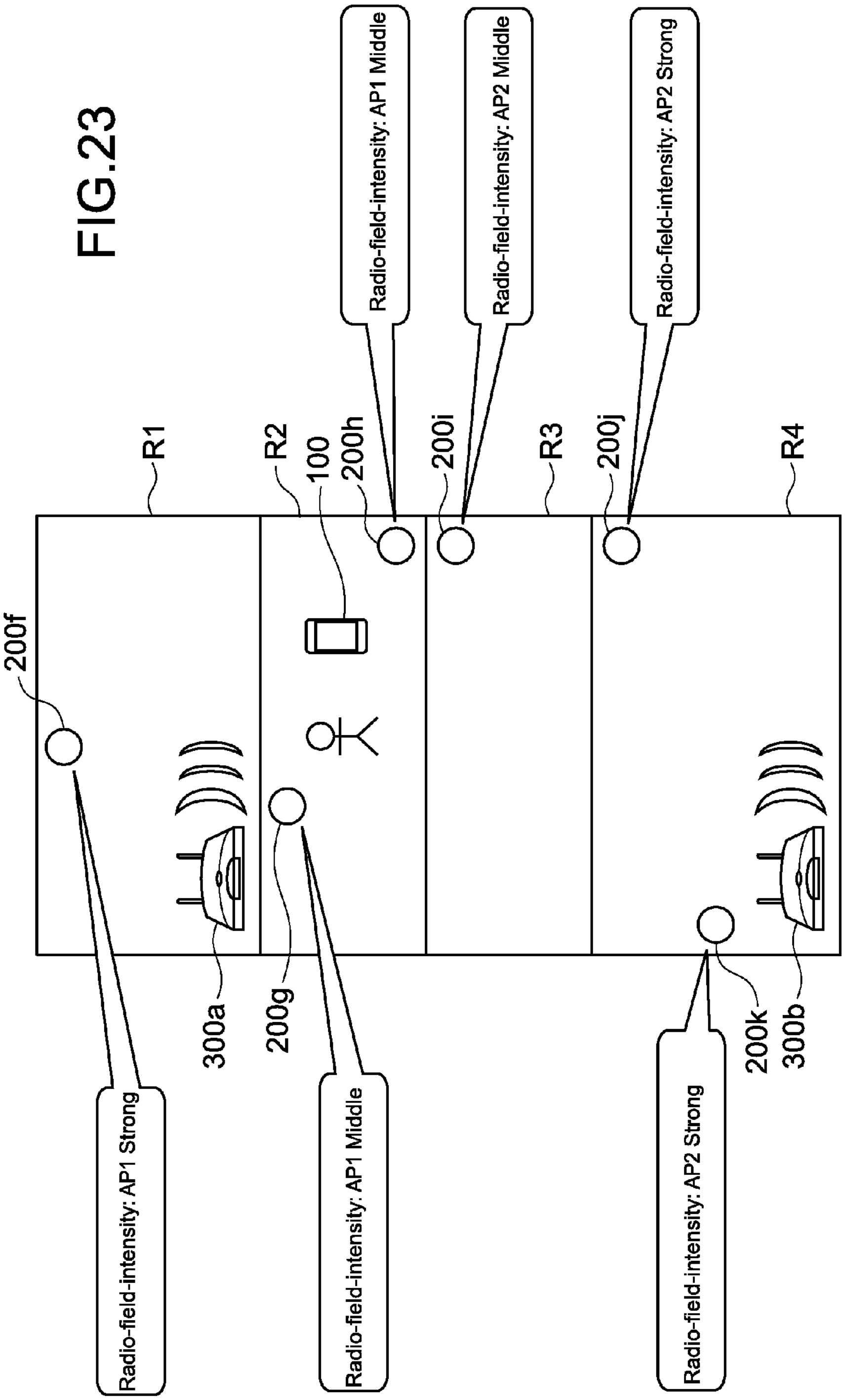
FIG. 23 is a diagram for illustrating a wireless communication system between devices and a remote control according to a modified example 2.

FIG. 23 is a diagram showing correlations of radio field intensities of the respective devices 200. In FIG. 23, an AP 300*a* is installed in the room R1, and another AP 300*b* is installed in the room R4, which is distant from the room R1. The room layout and the device installation locations of FIG. 23 are the same as those of FIG. 21.

The remote control 100 finally obtains the following radio-field-intensity values of the respective devices 200*f* to 200*k*. In the following, the first value is a radio-field-intensity value, in a case where the radio wave source is the AP 300*a*. The second value is a radio-field-intensity value, in a case where the radio wave source is the AP 300*b*.

The radio field intensities of the device 200*f*: first value="strong",

The radio field intensities of the device 200*g*: first value="middle",

The radio field intensities of the device 200*h*: first value="middle",

The radio field intensities of the device 200*i*: second value="middle",

The radio field intensities of the device 200*j*: second value="strong", and The radio field intensities of the device 200*k*: second value="strong".

The setting unit 122 of the remote control 100 identifies the installation locations of the respective devices as one or more rooms based on the first value or the second value. For example, one room (room R1) is assigned to the radio field intensity of the device 200*f* (first value="strong"). It is determined that the device 200*f* is installed in the room R1. Further, another room (room R2) is assigned to the radio field intensity of each of the devices 200*g* and 200*h* (first value="middle"). It is determined that the devices 200*g* and 200*h* are installed in the room R2. Similarly, one room (room R3) is assigned to the radio field intensity of the device 200*i* (second value="middle"). It is determined that the device 200*i* is installed in the room R3. Further, another room (room R4) is assigned to the radio field intensity of each of the devices 200*j* and 200*k* (second value="strong"). It is determined that the devices 200*j* and 200*k* are installed in the room R4.

MODIFIED EXAMPLE 3

In the modified example 2, installation locations of a plurality of devices are identified as one or more rooms by using a plurality of APs. Alternatively, installation locations of a plurality of devices may be identified as one or more rooms by using two APs. One is an AP having directivity. The other AP omnidirectionally transmits/receives radio waves.

Figure 24:
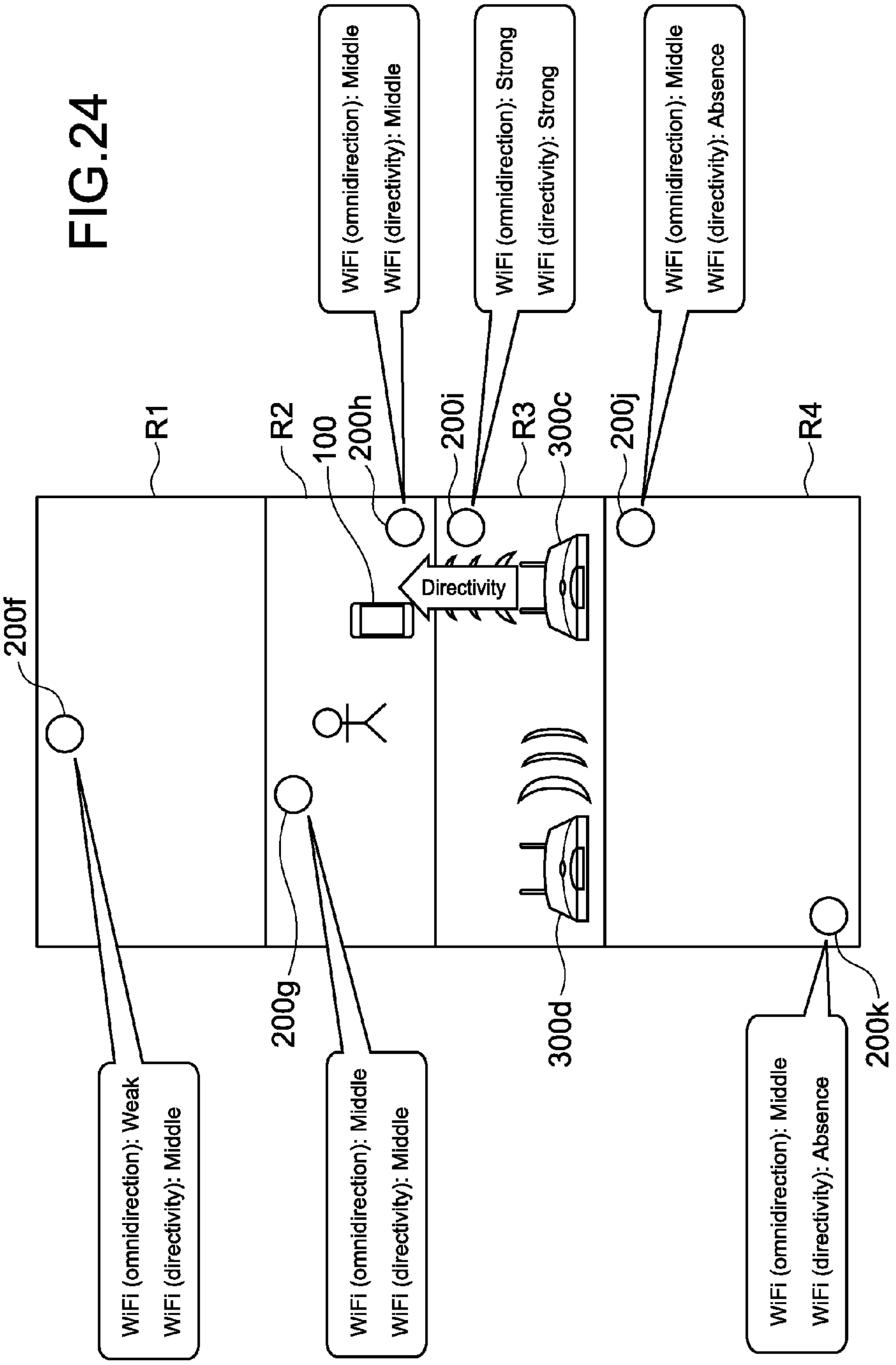
FIG. 24 is a diagram for illustrating a wireless communication system between devices and a remote control according to a modified example 3.

FIG. 24 is a diagram showing correlations of radio field intensities of the respective devices 200. In FIG. 24, APs 300*c* and 300*d* are installed in the same room R3. The AP 300*c* is an AP having directivity. The AP 300*d* omnidirectionally transmits/receives radio waves. The room layout and the device installation locations of FIG. 24 are the same as those of FIG. 21.

The remote control 100 finally obtains the following radio-field-intensity values of the respective devices 200*f* to 200*k*. In the following, the first value is a radio-field-intensity value, in a case where the radio wave source is the AP 300*c*. The second value is a radio-field-intensity value, in a case where the radio wave source is the AP 300*d*.

The radio field intensities of the device 200*f*: first value="middle", second value="weak", The radio field intensities of the device 200*g*: first value="middle", second value="middle", The radio field intensities of the device 200*h*: first value="middle", second value="middle", The radio field intensities of the device 200*i*: first value="strong", second value="strong", The radio field intensities of the device 200*j*: first value="absent", second value="middle", and The radio field intensities of the device 200*k*: first value="absent", second value="middle".

The setting unit 122 of the remote control 100 identifies the installation locations of the respective devices as one or more rooms based on the combinations of the first value and the second value. For example, one room (room R1) is assigned to the combination of the radio field intensities of the device 200*f* (combination of first value="middle" and second value="weak"). It is determined that the device 200*f* is installed in the room R1. Further, another room (room R2) is assigned to the combination of the radio field intensities of each of the devices 200*g* and 200*h* (combination of first value="middle" and second value="middle"). It is determined that the devices 200*g* and 200*h* are installed in the room R2. Similarly, one room (room R3) is assigned to the combination of the radio field intensities of the device 200*i* (combination of first value="strong" and second value="strong"). It is determined that the device 200*i* is installed in the room R3. Further, another room (room R4) is assigned to the combination of the radio field intensities of each of the devices 200*j* and 200*k* (combination of first value="middle" and second value="absent"). It is determined that the devices 200*j* and 200*k* are installed in the room R4.

MODIFIED EXAMPLE 4

In the above-mentioned embodiments and modified examples, as the wireless communication standards of the wireless communication systems between the device 200 and the remote control 100, the wireless communication systems (Wi-Fi Direct, wireless LAN communication via AP), which use high-transmissive wireless media, are used. In addition to the wireless communication systems using high-transmissive wireless media, a wireless communication system, which uses a non-transmissive or low-transmissive wireless medium (for example, IR signal), may be supplementarily used.

Figure 25:
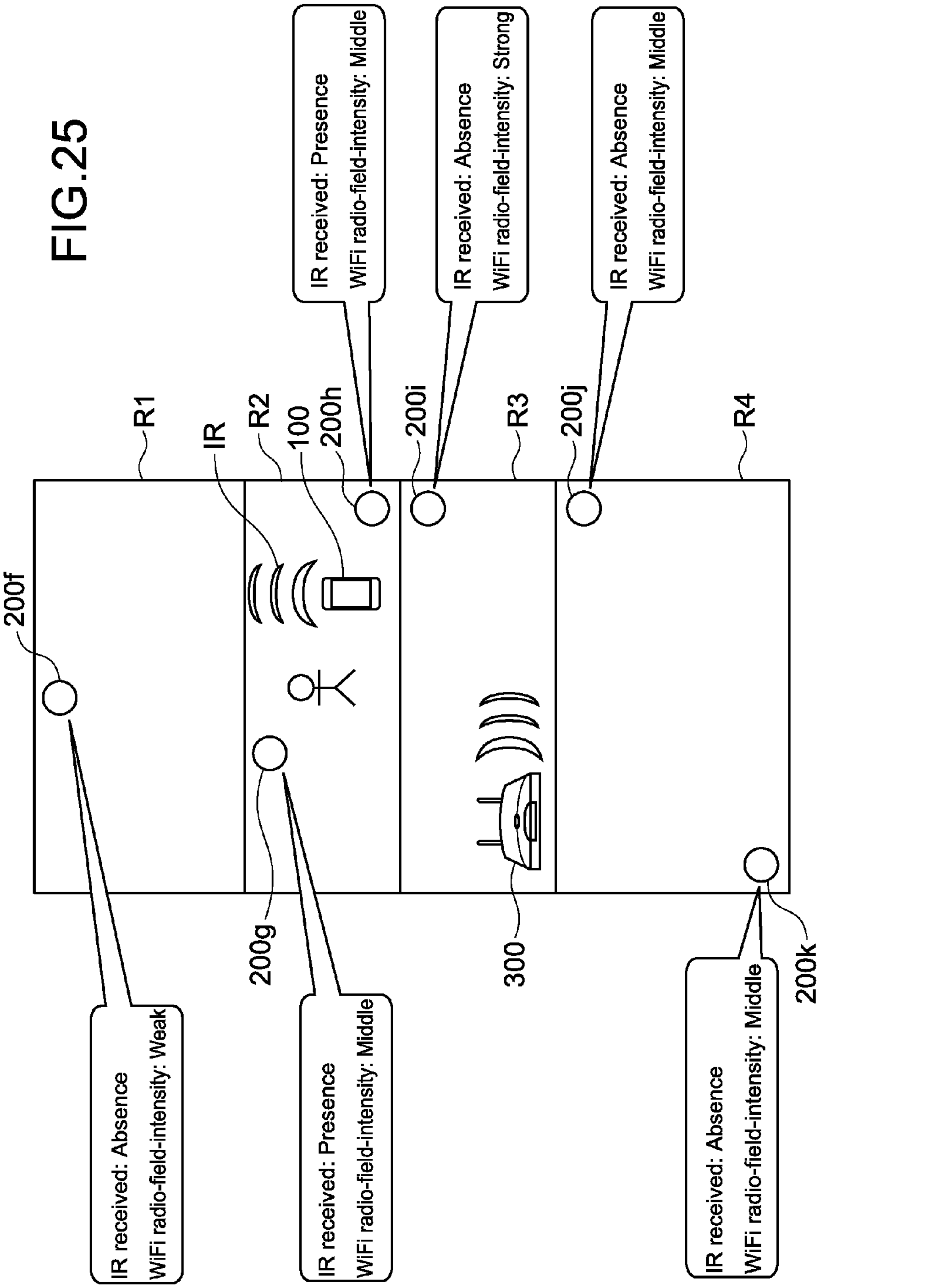
FIG. 25 is a diagram for illustrating a wireless communication system between devices and a remote control according to a modified example 4.

FIG. 25 is a diagram showing correlations of radio field intensities of the respective devices 200. In FIG. 25, the remote control 100 is installed in the room R2, and the AP 300 is installed in the room R3, which is next to the room R2. The remote control 100 is an IR signal source. The room layout and the device installation locations of FIG. 25 are the same as those of FIG. 21.

Here, the remote control 100 as an IR signal source transmits an IR signal to the plurality of devices 200 installed in the respective rooms. The device 200 receives the IR signal. Then, the device 200 sends a response (Response) to the remote control 100 by means of, for example, the wireless LAN (response=present). On the other hand, if the device 200 does not receive the IR signal, the device 200 does not send a response (Response) to the remote control 100 (response=absent). The remote control 100 identifies installation locations of the respective devices 200 as one or more rooms, based on responses from the respective devices 200 and radio-field-intensity values of the respective devices 200. The responses are IR-signal-reception responses replied from the respective devices 200. The radio-field-intensity values are sent from the AP to the remote control 100.

The remote control 100 finally obtains the following radio-field-intensity values of the respective devices 200*f* to 200*k*. In the following, the first value is presence/absence of the IR-signal-reception response. The second value is a radio-field-intensity value, in a case where the radio wave source is the AP 300.

The radio field intensities of the device 200*f*: first value="absent", second value="weak", The radio field intensities of the device 200*g*: first value="present", second value="middle", The radio field intensities of the device 200*h*: first value="present", second value="middle", The radio field intensities of the device 200*i*: first value="absent", second value="strong", The radio field intensities of the device 200*j*: first value="absent", second value="middle", The radio field intensities of the device 200*k*: first value="absent", second value="middle", The setting unit 122 of the remote control 100 identifies the installation locations of the respective devices as one or more rooms based on the combinations of the first value and the second value. For example, one room (room R1) is assigned to the combination of the radio field intensities of the device 200*f* (combination of first value="absent" and second value="weak"). It is determined that the device 200*f* is installed in the room R1. Further, another room (room R2) is assigned to the combination of the radio field intensities of each of the devices 200*g* and 200*h* (combination of first value="present" and second value="middle"). It is determined that the devices 200*g* and 200*h* are installed in the room R2. Similarly, one room (room R3) is assigned to the combination of the radio field intensities of the device 200*i* (combination of first value="absent" and second value="strong"). It is determined that the device 200*i* is installed in the room R3. Further, another room (room R4) is assigned to the combination of the radio field intensities of each of the devices 200*j* and 200*k* (combination of first value="absent" and second value="middle"). It is determined that the devices 200*j* and 200*k* are installed in the room R4.

Figure 26:
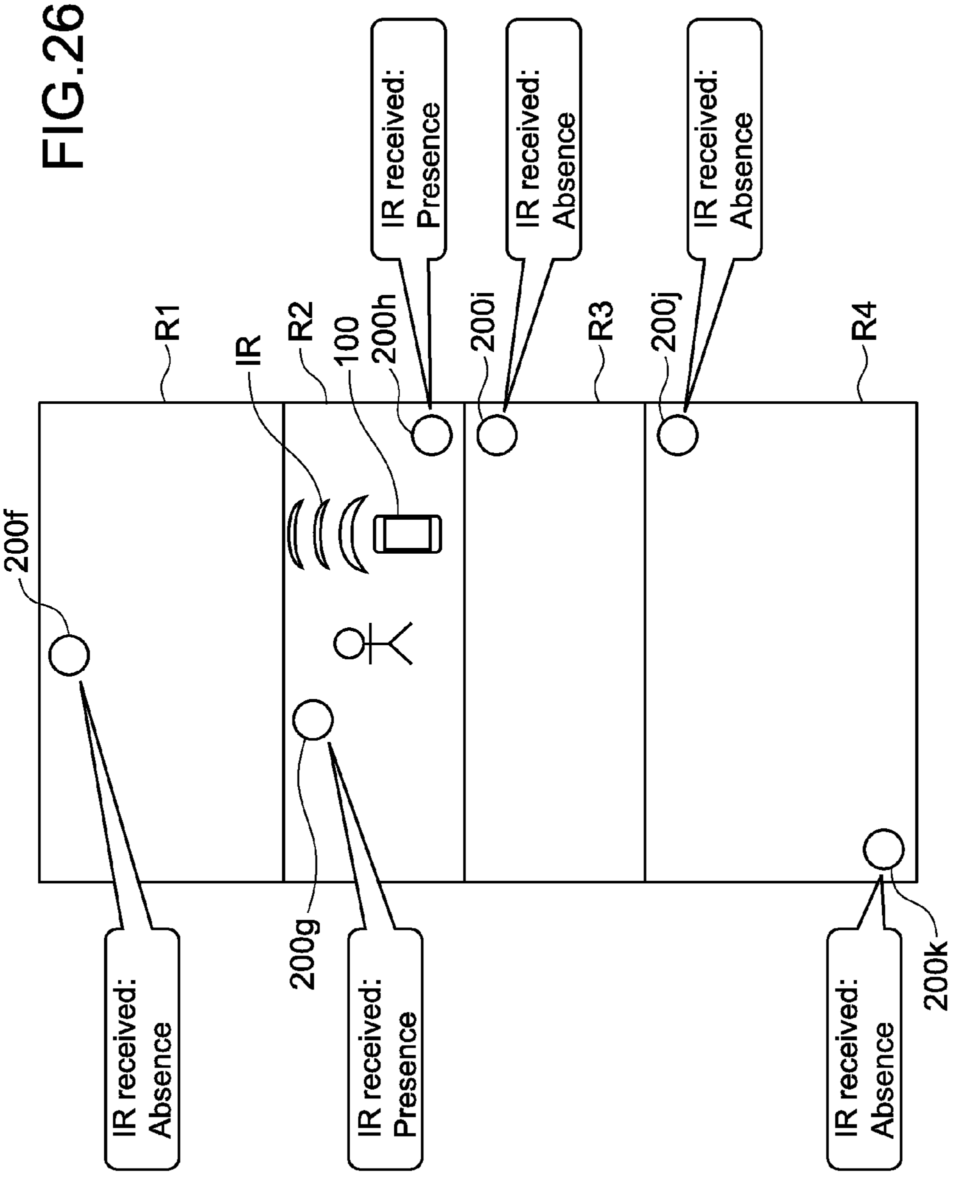
FIG. 26 is a diagram for illustrating a wireless communication system between devices and a remote control.

As shown in FIG. 26, as a wireless communication system between the device 200 and the remote control 100, a wireless communication system, which uses a non-transmissive or low-transmissive wireless medium (for example, IR signal), is only used. In this case, the remote control 100 may only obtain responses from the devices 200*g* and 200*h*, which are installed in the room R2, in which the remote control 100 is located. As a result, the remote control 100 is not capable of setting correlations between the rooms R1, R3, and R4 and the devices 200*f*, 200*i*, 200*j*, and 200*k*, which are installed in the rooms R1, R3, and R4. However, according to this modified example, two wireless communication systems are used. One wireless communication system uses a non-transmissive or low-transmissive wireless medium. The other wireless communication system uses a high-transmissive wireless medium. Because both of them are used, the correlations between the respective rooms and the respective devices are set. By using the correlations, the respective installation locations of the plurality of devices are identified as one or more rooms.

MODIFIED EXAMPLE 5

Figure 27:
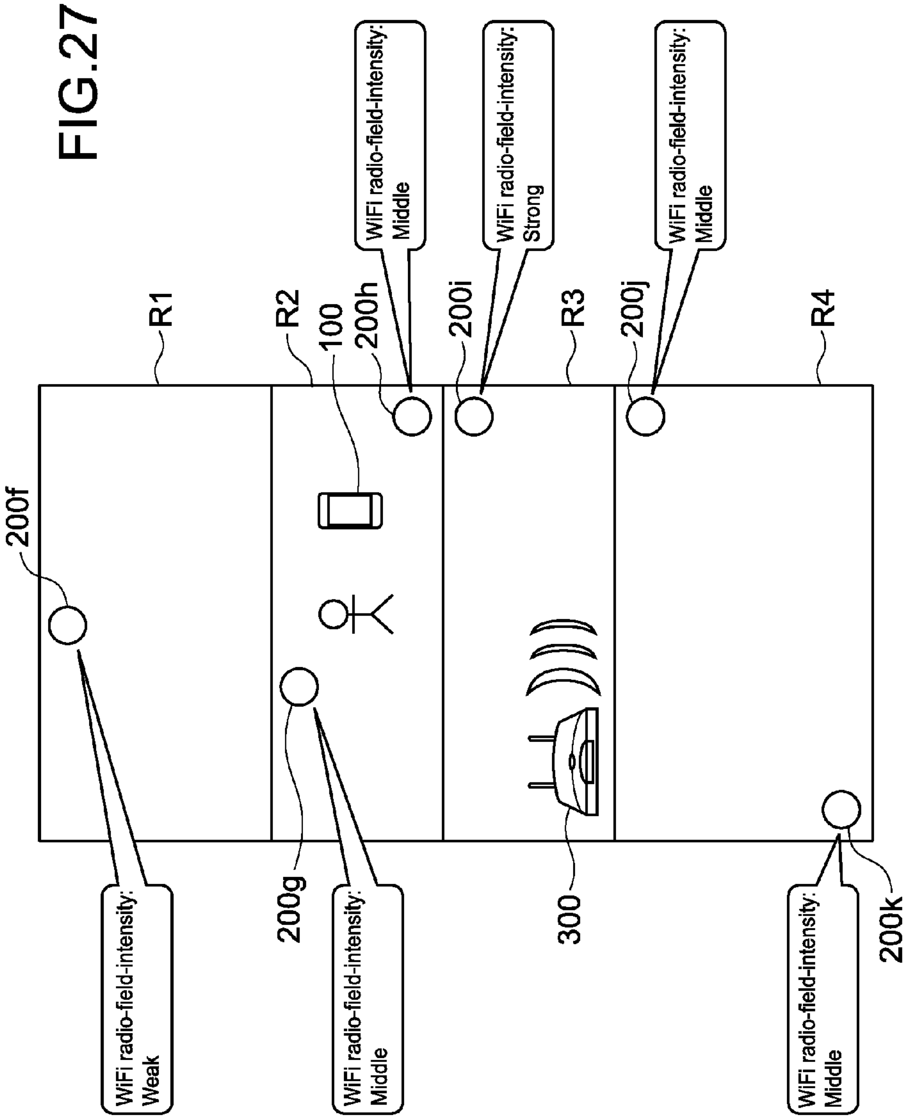
FIG. 27 is a diagram for illustrating a wireless communication system between devices and a remote control according to a modified example 5.

In the above-mentioned embodiments, as the wireless communication standard of the wireless communication system between the device 200 and the remote control 100, Wi-Fi Direct is employed. Wi-Fi Direct enables direct and interactive communication between devices in a wireless LAN. However, the wireless communication system, which enables direct and interactive communication, may not be used. Alternatively, as a wireless communication system, as shown in FIG. 27, wireless LAN communication via the AP 300 may be employed. According to this configuration also, similar to the above-mentioned embodiments, the correlations between the respective rooms and the respective devices are set. By using the correlations, the respective installation locations of the plurality of devices are identified as one or more rooms.

Note that, the present technology may employ the following configurations.

(1) A remote control, comprising:

a wireless communication unit configured to be capable of sending a control signal for controlling a device by means of wireless communication; and a determining unit configured to transmit a device detection request by means of the wireless communication unit, and to identify installation locations of a plurality of devices as one or more zones, respectively, based on responses from the plurality of devices having received the device detection request, each of the responses including measurement information reflecting an installation location.

(2) The remote control according to (1), wherein the determining unit is configured to receive responses including a plurality of pieces of radio-field-intensity information, respectively, the plurality of pieces of radio-field-intensity information being detected by the plurality of devices having received the device detection request, respectively, and to identify installation locations of the plurality of devices as one or more zones, respectively, based on the plurality of pieces of radio-field-intensity information of the plurality of devices, respectively.

(3) The remote control according to (1) or (2), wherein the determining unit is configured to identify installation locations of the plurality of devices as one or more zones, respectively, based on a distribution of a plurality of radio-field-intensity values, the plurality of radio-field-intensity values being replied from the plurality of devices, respectively.

(4) The remote control according to any one of (1) to (3), further comprising:

a display unit including a display screen;

a zone selection unit configured to allow a user to select an arbitrary zone from the one or more zones; and a GUI display unit configured to display an operation GUI of each of one or more devices on the display screen, the installation location of each of the one or more devices being identified as the selected zone.

(5) The remote control according to any one of (1) to (4), wherein the zone is a room in a building.

(6) The remote control according to (1), wherein the determining unit is configured to receive responses including a plurality of pieces of GPS (Global Positioning System) information, respectively, the plurality of pieces of GPS information being detected by the plurality of devices having received the device detection request, respectively, and to identify installation locations of the plurality of devices as one or more zones, respectively, based on the plurality of pieces of GPS information of the plurality of devices, respectively.

(7) The remote control according to (1) or (6), wherein the determining unit is configured to identify installation locations of the plurality of devices as one or more zones, respectively, based on a distribution of a plurality of pieces of GPS information, the plurality of pieces of GPS information being replied from the plurality of devices, respectively.

(8) The remote control according to any one of (1), (6), and (7), further comprising:

a display unit including a display screen;

a zone selection unit configured to allow a user to select an arbitrary zone from the one or more zones; and a GUI display unit configured to display an operation GUI of each of one or more devices on the display screen, the installation location of each of the one or more devices being identified as the selected zone.

(9) The remote control according to any one of (1), (6), (7), and (8), wherein the zone is a room in a building.

(10) A remote control method, comprising:

transmitting, by a determining unit of a remote control, a device detection request by means of a wireless communication unit, the wireless communication unit being configured to be capable of sending a control signal for controlling a control-target device by means of wireless communication; and identifying, by the determining unit, installation locations of a plurality of devices as one or more zones, respectively, based on responses from the plurality of devices having received the device detection request, each of the responses including measurement information reflecting an installation location.

(11) A remote control system, comprising:

a remote control; and a plurality of devices capable of being controlled by the remote control, wherein each of the devices includes a first wireless communication unit configured to be capable of receiving a control signal from the remote control by means of wireless communication, and a measuring unit configured to measure measurement information reflecting an installation location, and the remote control includes a second wireless communication unit configured to be capable of sending the control signal for controlling the device by means of wireless communication, and a determining unit configured to transmit a device detection request by means of the second wireless communication unit, and to identify installation locations of a plurality of devices as one or more zones, respectively, based on responses from the plurality of devices having received the device detection request, each of the responses including the measurement information reflecting an installation location.

It should be understood by those skilled in the art that various modifications, combinations, sub-combinations and alterations may occur depending on design requirements and other factors insofar as they are within the scope of the appended claims or the equivalents thereof.

What is claimed is:

1. A remote control, comprising:

circuitry configured to:

send a control signal for controlling a device via wireless communication; and transmit a device detection request to the device via wireless communication;

receive a response from the device based on the transmitted device detection request, the response received from the device including measurement information associated with the device;

identify an installation location of the device as a zone in an event that a difference between a value of the measurement information included in the response received from the device and an average value of measurement information of one or more devices in the zone is equal to or below a reference value;

register a device identifier corresponding to the device in association with an identifier of the zone in a zone correlation table;

transmit a request for device information to the device;

receive a response from the device including at least a device type identifier;

determine a command set identifier corresponding to one of a plurality of command sets based on the device type identifier; and register the device identifier of the device in association with the command set identifier in a command set identification table.

2. The remote control according to claim 1, wherein the circuitry is further configured to:

receive the response including radio-field-intensity information, the radio-field-intensity information being detected by the device having received the device detection request; and identify the installation location of the device as the zone based on the radio-field-intensity information of the device.

3. The remote control according to claim 2, wherein the circuitry is further configured to identify the installation location of the device as the zone based on a distribution of a plurality of radio-field-intensity values, the plurality of radio-field-intensity values being replied from the device.

4. The remote control according to claim 3, further comprising:

a display including a display screen, wherein the circuitry is further configured to:

allow a user to select an arbitrary zone from one or more zones; and display an operation graphical user interface (GUI) of each of the one or more devices on the display screen, the installation location of each of the one or more devices being identified as the selected zone.

5. The remote control according to claim 4, wherein each of the one or more zones is a room in a building.

6. The remote control according to claim 1, wherein the circuitry is further configured to:

receive the response including global positioning system (GPS) information, the GPS information being detected by the device having received the device detection request; and identify the installation location of the device as the zone, based on the GPS information of the device.

7. The remote control according to claim 6, wherein the circuitry is further configured to identify the installation location of the device as the zone based on distribution of a plurality of pieces of GPS information, the plurality of pieces of GPS information being replied from the device.

8. The remote control according to claim 7, further comprising:

a display including a display screen, wherein the circuitry is further configured to:

allow a user to select an arbitrary zone from one or more zones; and display an operation graphical user interface (GUI) of each of the one or more devices on the display screen, the installation location of each of the one or more devices being identified as the selected zone.

9. The remote control according to claim 8, wherein each of the one or more zones is a room in a building.

10. A remote control method, comprising:

transmitting, with circuitry of a remote control, a device detection request to a device via wireless communication, the circuitry further sending a control signal for controlling the device via wireless communication;

receiving, with the circuitry of the remote control, a response from the device based on the transmitted device detection request, the response received from the device including measurement information associated with the device;

identifying, with the circuitry of the remote control, an installation location of the device as a zone in an event that a difference between a value of the measurement information included in the response received from the device and an average value of measurement information of one or more devices in the zone is equal to or below a reference value;

registering, with the circuitry, a device identifier corresponding to the device in association with an identifier of the zone in a zone correlation table;

transmitting, with the circuitry, a request for device information to the device;

receiving, with the circuitry, a response from the device including at least a device type identifier;

determining, with the circuitry, a command set identifier corresponding to one of a plurality of command sets based on the device type identifier; and registering, with the circuitry, the device identifier of the device in association with the command set identifier in a command set identification table.

11. A remote control system, comprising:

a remote control; and a device configured to be controlled by the remote control, wherein the device includes circuitry configured to:

receive a control signal from the remote control via wireless communication, and measure measurement information reflecting an installation location, and the remote control includes circuitry configured to:

send the control signal for controlling the device via wireless communication, transmit a device detection request to the device by wireless communication, receive a response from the device based on the transmitted device detection request, the response received from the device including measurement information associated with the device, identify an installation location of the device as a zone, in an event that a different between a value of the measurement information included in the response received from the device and an average value of measurement information of one or more devices in the zone is equal to or below a reference value, register a device identifier corresponding to the device in association with an identifier of the zone in a zone correlation table, transmit a request for device information to the device, receive a response from the device including at least a device type identifier, determine a command set identifier corresponding to one of a plurality of command sets based on the device type identifier, and register the device identifier of the device in association with the command set identifier in a command set identification table.

12. The remote control according to claim 1, wherein the circuitry is further configured to:

identify location information of the device as a first zone of one or more zones in a case that the comparison result is equal to or below the reference value; and identify location information of the device as a second zone of the one or more zones in a case that the comparison result is above the reference value.

* * * * *